(12) United States Patent
Ohkawa et al.

(10) Patent No.: US 12,216,393 B2
(45) Date of Patent: Feb. 4, 2025

(54) ILLUMINATION DEVICE AND DISPLAY DEVICE

(71) Applicant: SONY GROUP CORPORATION, Tokyo (JP)

(72) Inventors: Shingo Ohkawa, Kanagawa (JP); Gen Yonezawa, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/512,314

(22) Filed: Nov. 17, 2023

(65) Prior Publication Data
US 2024/0085775 A1     Mar. 14, 2024

Related U.S. Application Data

(63) Continuation of application No. 17/760,734, filed as application No. PCT/JP2020/035485 on Sep. 18, 2020, now Pat. No. 11,829,060.

(30) Foreign Application Priority Data

Sep. 24, 2019   (JP) ................................ 2019-173429

(51) Int. Cl.
G03B 21/20          (2006.01)
(52) U.S. Cl.
CPC .................................. G03B 21/208 (2013.01)
(58) Field of Classification Search
CPC .............. G03B 21/2066; G03B 21/208; G03B 21/2013
See application file for complete search history.

(56) References Cited

U.S. PATENT DOCUMENTS 10,732,425 B2    8/2020  Tajiri
2022/0382138 A1  12/2022 Ohkawa et al.

FOREIGN PATENT DOCUMENTS

JP    2010-102049    5/2010
JP    2017-208347   11/2017
(Continued)

OTHER PUBLICATIONS

International Search Report and Written Opinion for International (PCT) Patent Application No. PCT/JP2020/035485, dated Oct. 27, 2020, 7 pages.
(Continued)

*Primary Examiner* — Robert J May
(74) *Attorney, Agent, or Firm* — Sheridan Ross PC

(57) ABSTRACT

An illumination device includes: a plurality of light source assemblies; and a plate-shaped optical unit on which light source light beams from the plurality of light source assemblies are incident from mutually different directions, and the plate-shaped optical unit is sectioned into a reflection surface and a transmission surface in accordance with an incident light intensity distribution of each of the light source light beams. Then, transmitted light having passed through the plate-shaped optical unit among the light source light beams and reflected light having been reflected by the plate-shaped optical unit among the light source light beams are emitted with directions aligned, and a boundary between the transmission surface and the reflection surface in the plate-shaped optical unit is formed at a position where incident light intensities of the light source light beams individually from the plurality of light source assemblies have substantially equal values to each other.

19 Claims, 17 Drawing Sheets

(56) References Cited

FOREIGN PATENT DOCUMENTS

| | | |
|---|---|---|
| JP | 2018-021990 | 2/2018 |
| JP | 2020-052236 | 4/2020 |
| JP | 2020-052341 | 4/2020 |

OTHER PUBLICATIONS

Notice of Allowance for U.S. Appl. No. 17/760,734, dated Jul. 25, 2023, 9 pages.

ILLUMINATION DEVICE AND DISPLAY DEVICE

CROSS REFERENCE TO RELATED APPLICATIONS

This application is a continuation of U.S. patent application Ser. No. 17/760,734, filed Mar. 15, 2022, now U.S. Pat. No. 11,829,060, which is a national stage application under 35 U.S.C. 371 and claims the benefit of PCT Application No. PCT/JP2020/035485, having an international filing date of Sep. 18, 2020, which designated the United States, which PCT application claimed the benefit of Japanese Patent Application No. 2019-173429, filed Sep. 24, 2019, the entire disclosures of each of which are incorporated herein by reference.

TECHNICAL FIELD

The present disclosure relates to an illumination device and a display device, and in particular to an illumination device in which a plurality of light source assemblies is provided, light source light beams individually from the plurality of light source assemblies are incident from different directions, and emission directions of incident light beams are aligned, and a display device including the illumination device in a light source unit.

BACKGROUND ART

An illumination device applicable as a light source unit of a display device such as a projector is required to achieve both reduction of a size of a luminous flux emitted from the illumination device and suppression of a decrease in luminance. In this regard, as the illumination device, a technique has been proposed in which a light synthesizing member including transmission areas and strip-shaped reflective films alternately is provided to reduce a luminous flux size of illuminating light (see, for example, Patent Document 1).

Furthermore, as an illumination device, a technique has been proposed in which a light composite unit in which striped mirrors having mutually different surface directions are alternately crossed is provided to suppress an increase in a composite bundle of rays (see, for example, Patent Document 2).

CITATION LIST

Patent Document

Patent Document 1: Japanese Patent Application Laid-Open No. 2010-102049
Patent Document 2: Japanese Patent Application Laid-Open No. 2018-21990

SUMMARY OF THE INVENTION

Problems to be Solved by the Invention

Such an illumination device is desired to further reduce a size of a luminous flux emitted from the illumination device while suppressing a decrease in luminance.

An object of the present disclosure is to provide an illumination device capable of further reducing a size of an emitted luminous flux, and a display device including the illumination device.

Solutions to Problems

The present disclosure is, for example,
(1) an illumination device including:
a plurality of light source assemblies; and
a plate-shaped optical unit on which light source light beams from the plurality of light source assemblies are incident from mutually different directions, the plate-shaped optical unit being sectioned into a reflection surface and a transmission surface in accordance with an incident light intensity distribution of each of the light source light beams, in which
transmitted light having passed through the plate-shaped optical unit among the light source light beams and reflected light having been reflected by the plate-shaped optical unit among the light source light beams are emitted with directions aligned, and
a boundary between the transmission surface and the reflection surface in the plate-shaped optical unit is formed at a position where incident light intensities of the light source light beams individually from the plurality of light source assemblies have substantially equal values to each other.
Furthermore, the present disclosure may be
(2) an illumination device including:
a plurality of light source optical units configured to emit light beams derived from a plurality of single light sources in a state where directions are aligned with each other; and
a first plate-shaped optical unit on which the light beams from the plurality of light source optical units are incident from mutually different directions, the first plate-shaped optical unit being sectioned into a reflection surface and a transmission surface in accordance with an incident light intensity distribution of each of the light beams, in which
transmitted light having passed through the first plate-shaped optical unit among the light beams and reflected light having been reflected by the first plate-shaped optical unit among the light beams are emitted with directions aligned,
a boundary between the transmission surface and the reflection surface in the first plate-shaped optical unit is formed at a position where incident light intensities of light beams individually from the plurality of light source optical units have substantially equal values to each other,
at least one of the light source optical units includes:
a plurality of light source assemblies; and
a second plate-shaped optical unit on which light source light beams from the plurality of light source assemblies are incident from mutually different directions, the second plate-shaped optical unit being sectioned into a reflection surface and a transmission surface in accordance with an incident light intensity distribution of each of the light source light beams,
a boundary between the transmission surface and the reflection surface in the second plate-shaped optical unit is formed at a position where incident light intensities of the light source light beams individually from the plurality of light source assemblies have substantially equal values to each other, and
transmitted light having passed through the second plate-shaped optical unit among the light source light beams and reflected light having been reflected by the second plate-shaped optical unit among the light source light beams are emitted with directions aligned.

Furthermore, the present disclosure may be (3) an illumination device including:

a plurality of light source optical units configured to emit light beams derived from a plurality of single light sources in a state where directions are aligned with each other; and a plate-shaped optical unit on which the light beams from the plurality of light source optical units are incident from mutually different directions, the plate-shaped optical unit being sectioned into a reflection surface and a transmission surface in accordance with an incident light intensity distribution of each of the light beams, in which transmitted light having passed through the plate-shaped optical unit among the light beams and reflected light having been reflected by the plate-shaped optical unit among the light beams are emitted with directions aligned, a boundary between the transmission surface and the reflection surface in the plate-shaped optical unit is formed at a position where incident light intensities of light beams individually from the plurality of light source optical units have substantially equal values to each other, at least one of the light source optical units includes:

a first polarized light source assembly and a second polarized light source assembly that are configured to mutually emit S-polarized light, and a ½ wavelength plate configured to convert the S-polarized light emitted from the first polarized light source assembly into P-polarized light; and a polarization dichroic mirror configured to allow the P-polarized light to pass through and configured to reflect the S-polarized light from the second polarized light source assembly, and a multiplexed light beam of the P-polarized light having passed through the polarization dichroic mirror and the S-polarized light reflected by the polarization dichroic mirror is emitted.

Furthermore, the present disclosure may be (4) a display device including:

a light source unit;

a light modulation-synthesis system configured to modulate and synthesize incident light;

an illumination optical system configured to guide light emitted from the light source unit to the light modulation-synthesis system; and a projection optical system configured to project an image emitted from the light modulation-synthesis system, in which the light source unit is the illumination device according to (1) described above.

MODE FOR CARRYING OUT THE INVENTION

Figure 1A:
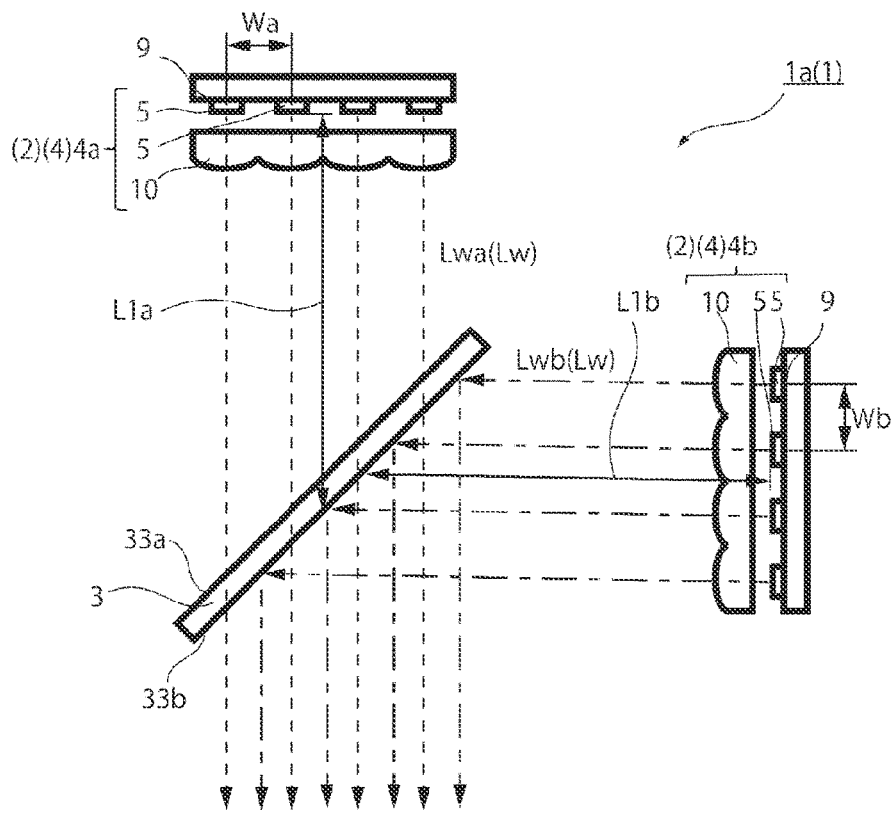
FIG. 1A is a view illustrating an example of a configuration of an illumination device according to a first embodiment.

Hereinafter, embodiments and the like of the present disclosure will be described with reference to the drawings.

Note that the description will be given in the following order.

1. Illumination device according to first embodiment
2. Illumination device according to second embodiment
3. Illumination device according to third embodiment
4. Display device Regarding any of: in one embodiment; between different embodiments; and a display device, configurations having substantially the same functional configuration are denoted by the same reference numerals in the present specification and the drawings, and a redundant description will be omitted.

The embodiments and the like to be described are preferred specific examples of the present disclosure. The contents of the present disclosure are not limited to these embodiments and the like.

1. First Embodiment (Illumination Device 1a)

FIG. 1A is a view illustrating an example of a configuration of an illumination device 1a (1) according to a first embodiment. The illumination device 1a includes a plurality of light source optical units 2 and a plate-shaped optical unit 3. The individual light source optical units 2 emit individual light beams derived individually from a plurality of single light sources 5, in a state where directions are aligned with each other. In the illumination device 1a, any of the individual light source optical units 2 includes a light source assembly 4. In the illumination device 1a, a first light source assembly 4a and a second light source assembly 4b are arranged as a plurality of light source assemblies 4.

(Traveling Path of Light Source Light Beam 0)

In the illumination device 1a, a light source light beam Lw (Lwa, Lwb) emitted from each of the plurality of light source assemblies 4 is incident on the plate-shaped optical unit 3. The light source light beams (Lwa, Lwb) are incident on the plate-shaped optical unit 3 from mutually different directions. The light source light beam Lw passes through a transmission surface 6 of the plate-shaped optical unit 3 or is reflected by a reflection surface 7 of the plate-shaped optical unit 3, in accordance with a position where the light source light beam Lw is incident on the plate-shaped optical unit 3. The light source light beam Lwa from the first light source assembly 4a is incident from a one surface 33a side of the plate-shaped optical unit 3, and passes toward an another surface 33b side to form transmitted light. The light source light beam Lwb from the second light source assembly 4b is incident on the another surface 33b side of the plate-shaped optical unit 3, and is reflected on the another surface 33b side to form reflected light. In the illumination device 1a, the transmitted light and the reflected light are emitted in a direction away from the plate-shaped optical unit 3 in a state where directions are aligned with each other.

Here, a case where predetermined two light beams are emitted with direction aligned includes a case where the two light beams are emitted in the same direction and a case where the two light beams are emitted in substantially the same direction. This is the same for the second and third embodiments described later.

(Light Source Assembly 4)

Figure 12:
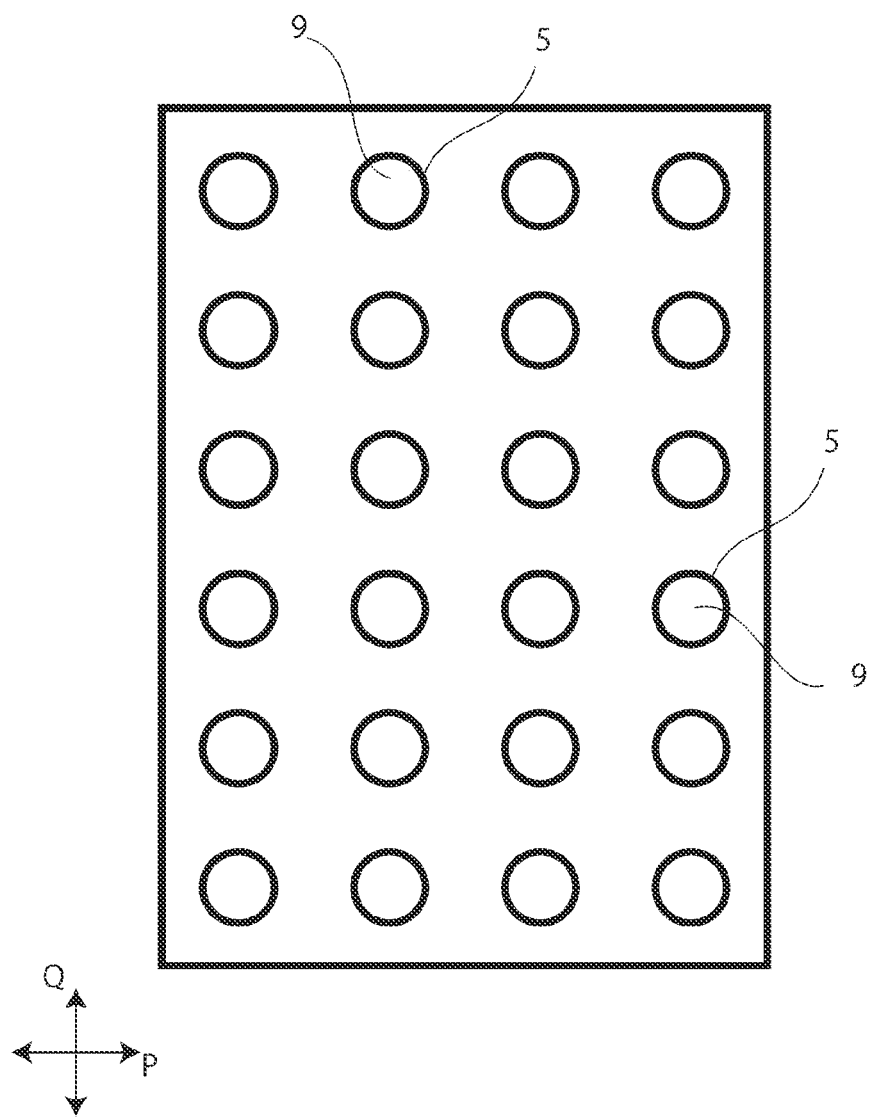
FIG. 12 is a view illustrating an example of an arrangement pattern of light emitting elements of a single light source arranged in the light source assembly.

The light source assembly 4 has a structure in which the single light sources 5 are aligned in a predetermined arrangement pattern. As illustrated in FIG. 12, in the example of the illumination device 1a of FIG. 1A, in both of the first light source assembly 4a and the second light source assembly 4b, light emitting elements 9 are arranged in a two-dimensional matrix of four vertical×six horizontal at intervals from each other, and the single light sources 5 are arranged in a two-dimensional matrix of four vertical×six horizontal. Note that the vertical and horizontal directions of the light source assembly 4 can be defined as coordinate axis directions of a two-dimensional coordinate system in a direction along a plane having a traveling direction of light as a normal line. In FIG. 12, a P-axis direction is the horizontal direction, and a Q-axis direction is the vertical direction.

(Arrangement Number of Single Light Sources 5)

An arrangement number of the single light sources 5 forming the first light source assembly 4a and an arrangement number of the single light sources 5 forming the second light source assembly 4b may be the same or different. Even in a case where an intensity of light from the single light source 5 forming the first light source assembly 4a is different from an intensity of light from the single light source 5 forming the second light source assembly 4b, the light intensities of the first light source assembly 4a and the second light source assembly 4b can be matched with each other by appropriately making a difference between the arrangement number of the single light sources 5 of the first light source assembly 4a and the arrangement number of the single light sources 5 of the second light source assembly 4b. Furthermore, a desired difference in light intensity can be achieved between the first light source assembly 4a and the second light source assembly 4b.

(Interval Between Single Light Sources 5)

An interval Wa between adjacent single light sources 5 forming the first light source assembly 4a and an interval Wb between adjacent single light sources 5 forming the second light source assembly 4b may be the same or different. In a case where an intensity of light from the single light source 5 forming the first light source assembly 4a is different from an intensity of light from the single light source forming the second light source assembly 4b, the light intensities of the first light source assembly and the second light source assembly can be matched with each other by appropriately making a difference between the interval Wa between the adjacent single light sources 5 of the first light source assembly 4a and the interval Wb between the adjacent single light sources 5 of the second light source assembly 4b. Furthermore, a desired intensity difference of a light intensity can be achieved between the first light source assembly 4a and the second light source assembly 4b.

(Type of Single Light Source 5)

The single light source 5 is not particularly limited as long as light traveling in a desired direction can be emitted as a light source light beam.

For example, in the example of FIG. 1A, in the single light source 5 constituting the light source assembly 4 (4a, 4b), a semiconductor laser is used as the light emitting element 9. Furthermore, in the example of FIG. 1A, a lens 10 for luminous flux diffusion adjustment is arranged in front of a light emission surface of the light emitting element 9 constituting the single light source 5. By arranging the lens 10, a balance between diffusion and convergence of a light beam emitted from the light emitting element 9 is adjusted.

Figure 7:
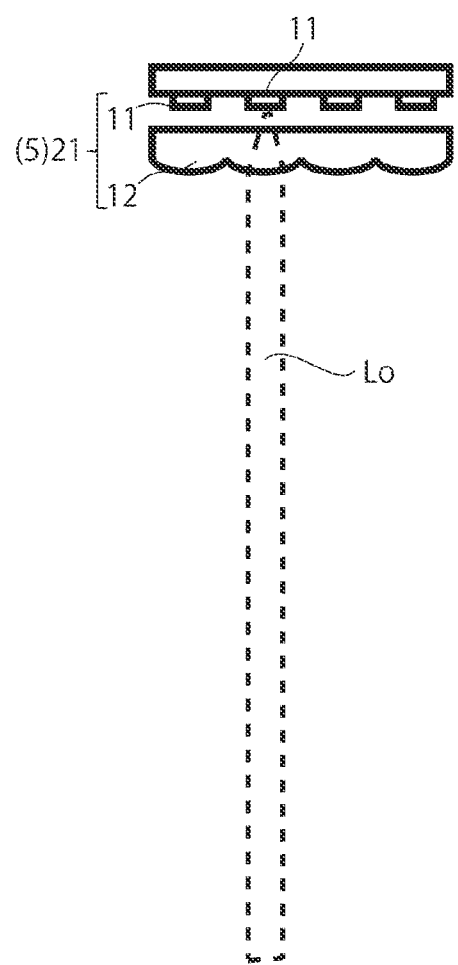
FIG. 7 is a view illustrating a configuration of an example of a single light source that forms a plurality of light source assemblies.

As the light emitting element 9, a light emitting diode 11 or the like can be used as illustrated in FIG. 7, in addition to the semiconductor laser. In a case where the light emitting diode 11 is used as the light emitting element 9, a condenser lens 12 is preferably arranged in front of a light emission surface of the light emitting element 9. In a case where the single light source 5 includes the light emitting diode 11 and the condenser lens 12, the single light source 5 forms a collimated light source 21. Since the single light source 5 forms the collimated light source 21, it is possible to suppress a possibility that a light beam Lo generated from the light emitting element 9 is diffused, as illustrated in FIG. 7.

(Light Intensity Distribution J)

Figure 1B:
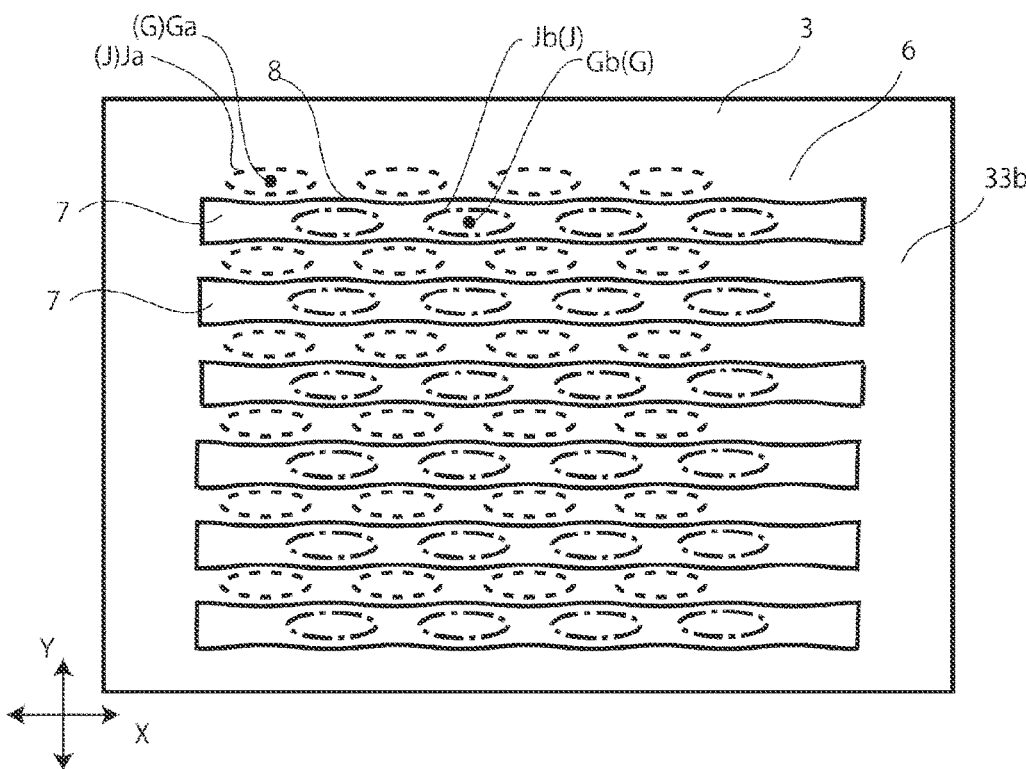
FIG. 1B is a view illustrating an example of a light intensity distribution of a light source light beam incident on a plate-shaped optical unit and an example of a formation pattern of a transmission surface and a reflection surface, in the example of the illumination device illustrated in FIG. 1A.

A light intensity distribution J of the light source light beam Lw derived from the single light source 5 forming the light source assembly 4 is not particularly limited, and may be a distribution in which an isotropic shape such as a circular shape is a contour shape or a distribution in which an anisotropic shape such as an elliptical shape is a contour shape as illustrated in FIG. 1B. The light intensity distribution J of the light source light beam Lw can be appropriately selected in accordance with a type of the single light source 5. Note that the light intensity distribution J indicates a light intensity distribution formed when the light source light beam Lw derived from the single light source 5 reaches the surface 33b of the plate-shaped optical unit 3. The contour shape in the light intensity distribution is defined as an outer edge shape of a portion specified by a region where an incident intensity is a predetermined value or more in an incident region of the light source light beam Lw derived from the single light source 5. For example, in the example illustrated in FIG. 1B, the light intensity distribution is specified as a distribution in which an anisotropic shape of an elliptical shape is a contour shape. In FIGS. 1B, 2A, 3B, 6B, 8B, 9B, 10B, 11A, 11B, 13A, 13B, 14B, and 17, the light intensity distribution J is specified in a region surrounded by a broken line or a one dotted chain line.

A light intensity distribution of a light source light beam derived from a single light source incorporated in a light source unit of a display device is often a distribution having an anisotropic contour shape. In consideration of this point, in the illumination device 1a, it is preferable that a first light intensity distribution Ja of the light source light beam Lw derived from the single light source 5 forming the first light source assembly 4a and a second light intensity distribution Jb of a light source light beam derived from the single light source 5 forming a second light source in the plate-shaped optical unit 3 have a distribution having an anisotropic contour shape, from the viewpoint of being easily used as an illumination device incorporated in a light source unit of a display device.

(Main Wavelength of Light Source Light Beam Lw)

A main wavelength (nm) of the light source light beam Lw derived from the single light source 5 forming the light source assembly 4 may be appropriately selected in accordance with a purpose. A main wavelength of the light source light beam Lwa from the first light source assembly 4a and a main wavelength of the light source light beam Lwb from the second light source assembly 4b may be the same or different from each other. Therefore, a color of the light source light beam Lwa from the first light source assembly 4a and a color of the light source light beam Lwb from the second light source assembly 4b may be the same or different from each other. In a case where the main wavelength of the light source light beam Lwa from the first light source assembly 4a and the main wavelength of the light source light beam Lwb from the second light source assembly 4b are different from each other, light beams of a plurality of colors can be emitted from the illumination device. Note that the main wavelength means a wavelength having a maximum value of an emission intensity in an emission spectrum of the light source assembly 4.

(Plate-Shaped Optical Unit 3)

The plate-shaped optical unit 3 has a configuration sectioned into the transmission surface 6 and the reflection surface 7. The transmission surface 6 and the reflection surface 7 are formed on the surface 33b (a light emission surface) on an emission surface side of transmitted light and reflected light derived from light source light beams, among surfaces of the plate-shaped optical unit 3.

A position and a direction of the plate-shaped optical unit 3 are determined such that transmitted light passing through the plate-shaped optical unit 3 and reflected light reflected by the plate-shaped optical unit 3 are emitted with directions aligned. For example, in the example of FIG. 1A, the first light source assembly 4a and the second light source assembly 4b are arranged such that a traveling direction of the light source light beam Lwa from the first light source assembly 4a and a traveling direction of the light source light beam Lwb from the second light source assembly 4b are substantially orthogonal to each other at a position of the plate-shaped optical unit. Then, the plate-shaped optical unit 3 is oriented such that both the light source light beams are to be incident at an angle of approximately 45°.

(Transmission Surface 6 and Reflection Surface 7)

In the surface 33b, the transmission surface 6 and the reflection surface 7 are classified in accordance with an incident light intensity distribution of a light beam from the light source optical unit 2. In the illumination device 1a of the first embodiment, the transmission surface 6 and the reflection surface 7 on the surface 33b of the plate-shaped optical unit 3 are classified in accordance with an incident light intensity distribution of the light source light beam Lw from the light source assembly 4.

The incident light intensity distribution of the light source light beam Lw from the light source assembly 4 is specified as a distribution indicating a relationship between a position on the surface 33b of the plate-shaped optical unit 3 and an intensity of the light source light beam. The incident light intensity distribution of the light source assembly 4 on the surface 33b of the plate-shaped optical unit is to be a distribution in which intensity distributions (referred to as unit distributions) of the light source light beams Lw derived from individual single light sources 5 forming the light source assembly 4 are collected and combined.

Figure 3B:
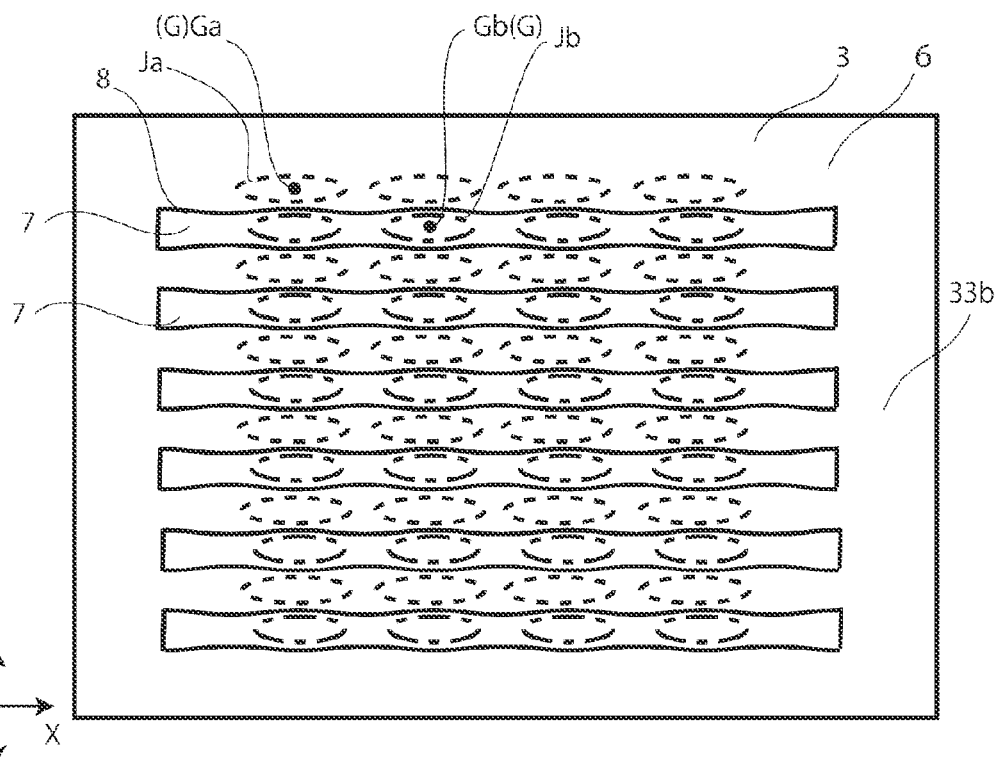
FIG. 3B is a view illustrating an example of a light intensity distribution of a light source light beam incident on a plate-shaped optical unit and an example of a formation pattern of a transmission surface and a reflection surface, in the example of the illumination device illustrated in FIG. 3A.
Figure 4A:
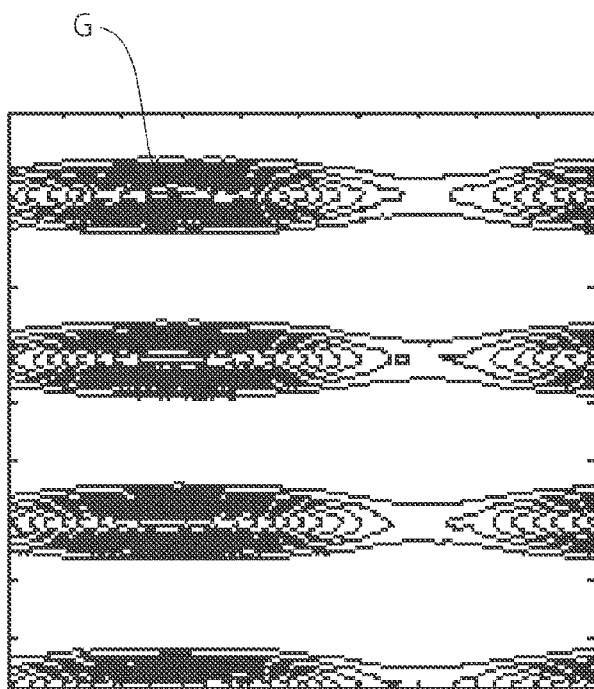
FIGS. 4A and 4B are views illustrating an example of an incident light intensity distribution of a light source light beam incident on a plate-shaped optical unit, in an example of the illumination device according to the first embodiment.

In the plate-shaped optical unit 3 of the illumination device of the example of FIG. 1A, the incident light intensity distribution of the light source light beam Lwa of the first light source assembly 4a is a distribution in which the first light intensity distributions Ja are arranged in a lattice shape, and adjacent unit distributions are continuous in the horizontal direction (for example, FIG. 4A). The incident light intensity distribution of the light source light beam Lwb of the second light source assembly 4b is also a distribution in which the second light intensity distributions Jb are arranged in a lattice shape, and adjacent unit distributions are continuous in the horizontal direction. The incident light intensity distribution of the light source light beam Lwa of the first light source assembly 4a and the incident light intensity distribution of the light source light beam Lwb of the second light source assembly 4b are determined such that the first light intensity distribution Ja and the second light intensity distribution Jb are alternately arranged in an oblique direction and arranged in zigzag as the entire arrangement of the light intensity distributions, in a case where the incident light intensity distribution of the light source light beam Lwa of the first light source assembly 4a and the incident light intensity distribution of the light source light beam Lwb of the second light source assembly 4b are combined. Note that the vertical and horizontal directions can be defined as coordinate axis directions of a two-dimensional coordinate system in a direction along a surface of the plate-shaped optical unit 3. For example, in FIG. 1B, an X-axis direction is the horizontal direction, and a Y-axis direction is the vertical direction. This is the same in FIGS. 3B, 6B, 8B, 9B, 10B, 11A, 11B, 13A, 13B, 14B, and 17.

In an example of the plate-shaped optical unit 3 of the illumination device of FIG. 1A, for both the incident light intensity distribution of the first light source assembly 4a and the incident light intensity distribution of the second light source assembly 4b, the incident light intensity decreases as being separated from a position (an intensity center G) where the incident light intensity becomes strongest, in each unit distribution. An intensity center Ga in the incident light intensity distribution of the first light source assembly 4a and an intensity center Gb in the incident light intensity distribution of the second light source assembly 4b are alternately arranged in an oblique direction in correspondence to the arrangement of the first light intensity distribution Ja and the second light intensity distribution Jb. Furthermore, the unit distribution of the single light source 5 of the first light source assembly 4a partially overlaps with an adjacent unit distribution of the single light source 5 of the second light source assembly 4b. That is, the incident light intensity distribution of the light source light beam Lwa of the first light source assembly 4a partially overlaps with the incident light intensity distribution of the light source light beam Lwb of the second light source assembly 4b.

Figure 4B:
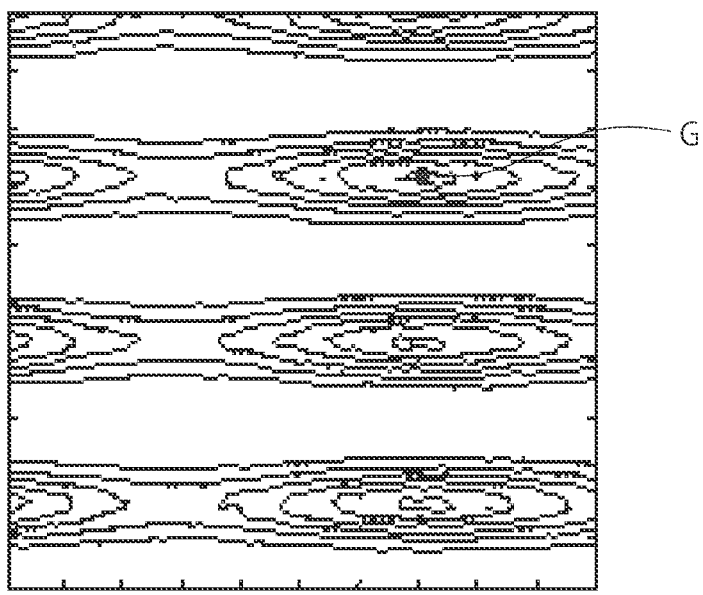

On the surface 33b of the plate-shaped optical unit, the incident light intensity distribution of the light source light beam Lwa from the first light source assembly 4a and the incident light intensity distribution of the light source light beam Lwb from the second light source assembly 4b may be mutually the same or different as illustrated in FIGS. 4A and 4B. For example, the incident light intensity distribution shown in the example of FIG. 4A may be the incident light intensity distribution of the light source light beam Lwa from the first light source assembly 4a, and the incident light intensity distribution shown in the example of FIG. 4B may be the incident light intensity distribution of the light source light beam Lwb from the second light source assembly 4b. FIGS. 4A and 4B illustrate a part of incident light intensity distributions of light source light beams from light source assemblies. FIGS. 4A and 4B are isogram charts in which an isogram of an intensity of a light source light beam is drawn for every constant value. The incident light intensity distributions illustrated in the examples of FIGS. 4A and 4B are mutually different in maximum value of an incident light intensity in a unit distribution and in width of a region where the incident light intensity exceeds a predetermined value. In the incident light intensity distribution illustrated in the example of FIG. 4A, the maximum value of the incident light intensity is large and the region where the incident light intensity exceeds the predetermined value is narrow, as compared with those of the incident light intensity distribution illustrated in the example of FIG. 4B.

(Boundary 8 Between Transmission Surface 6 and Reflection Surface 7)

A boundary 8 between the transmission surface 6 and the reflection surface 7 is formed at a position where incident light intensities of the light source light beams Lw individually from the plurality of light source assemblies 4 have substantially equal values. The incident light intensity of the light source light beam Lw from each of the light source assemblies 4 can be specified on the basis of the incident light intensity distribution of the light source light beam Lw from each of the light source assemblies 4.

As described above, the incident light intensity distribution of the light source light beam Lwa of the first light source assembly 4a and the incident light intensity distribution of the light source light beam Lwb of the second light source assembly 4b are determined such that the light intensity distributions are arranged in zigzag, in the plate-shaped optical unit 3 of the illumination device 1a of the example of FIG. 1A, in a case where the incident light intensity distribution of the light source light beam Lwa of the first light source assembly 4a and the incident light intensity distribution of the light source light beam Lwb of the second light source assembly 4b are combined. The incident light intensity distribution of the light source light beam Lwa of the first light source assembly 4a partially overlaps with the incident light intensity distribution of the light source light beam Lwb of the second light source assembly 4wb. In the overlapping portion of the incident light intensity distribution, the boundary 8 between the transmission surface 6 and the reflection surface 7 is defined at a position where the incident light intensities have substantially equal values.

(Position at which Incident Light Intensities have Substantially Equal Values)

The case where the boundary 8 between the transmission surface 6 and the reflection surface 7 is at a position where the incident light intensity of the light source light beam Lwa from the first light source assembly 4a and the incident light intensity of the light source light beam Lwb from the second light source assembly 4b have substantially equal values to each other indicates that the following position is the boundary 8 between the transmission surface 6 and the reflection surface 7.

In a case where a difference in main wavelength between the light source light beam Lwa from the first light source assembly 4a and the light source light beam Lwb from the second light source assembly 4b is less than 30 nm (a condition A), the boundary 8 between the transmission surface 6 and the reflection surface 7 is at a position where the following Formulas 1A to 3A are satisfied.

$(Ia\_f/Ia\_max) > 0.01$     Formula 1A:

$(Ib\_f/Ib\_max) > 0.01$     Formula 2A:

$0.5 < (Ib\_f/Ia\_f) < 2.0$     Formula 3A:

However, from the viewpoint of further increasing a ratio of an amount of light used as emitted light to an amount of light incident on the plate-shaped optical unit 3 from the light source assembly 4, it is preferable that the boundary 8 between the transmission surface 6 and the reflection surface 7 is a position where the following Formulas 1B to 3B are satisfied.

$(Ia\_f/Ia\_max) > 0.03$     Formula 1B:

$(Ib\_f/Ib\_max) > 0.03$     Formula 2B:

$0.5 < (Ib\_f/Ia\_f) < 2.0$     Formula 3B:

In a case where a difference in main wavelength between the light source light beam Lwa from the first light source assembly 4a and the light source light beam Lwb from the second light source assembly 4b is 30 nm or more (a condition B), the boundary 8 between the transmission surface 6 and the reflection surface 7 is a position where the following Formulas 4A to 6A are satisfied.

$(Ia\_f/Ia\_max) > 0.01$     Formula 4A:

$(Ib\_f/Ib\_max) > 0.01$     Formula 5A:

$0.5 < ((Ib\_f/Ib\_max)/(Ia\_f/Ia\_max)) < 2.0$     Formula 6A:

However, from the viewpoint of further increasing a ratio of an amount of light used as emitted light to an amount of light incident on the plate-shaped optical unit 3 from the light source assembly 4, it is preferable that the boundary 8 between the transmission surface 6 and the reflection surface 7 is a position where the following Formulas 4B to 6B are satisfied.

Figure 2A:
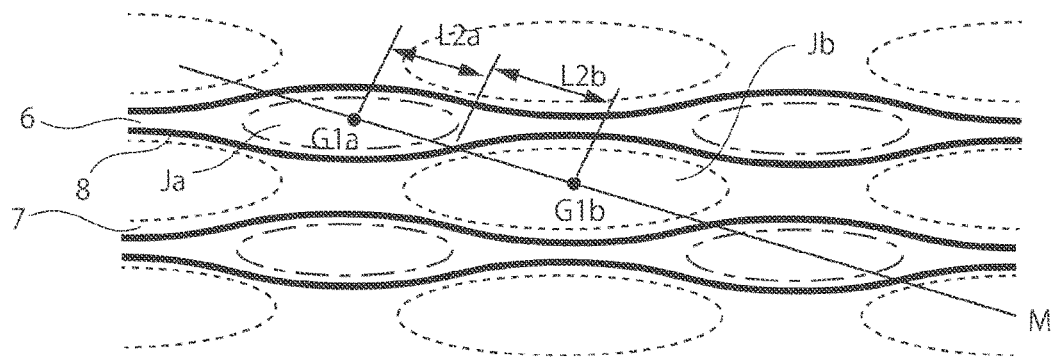
FIG. 2A is a view illustrating an example of a first intensity center G1*a* and a second intensity center G1*b*, and a straight line M connecting G1*a* and G1*b*.
Figure 2B:
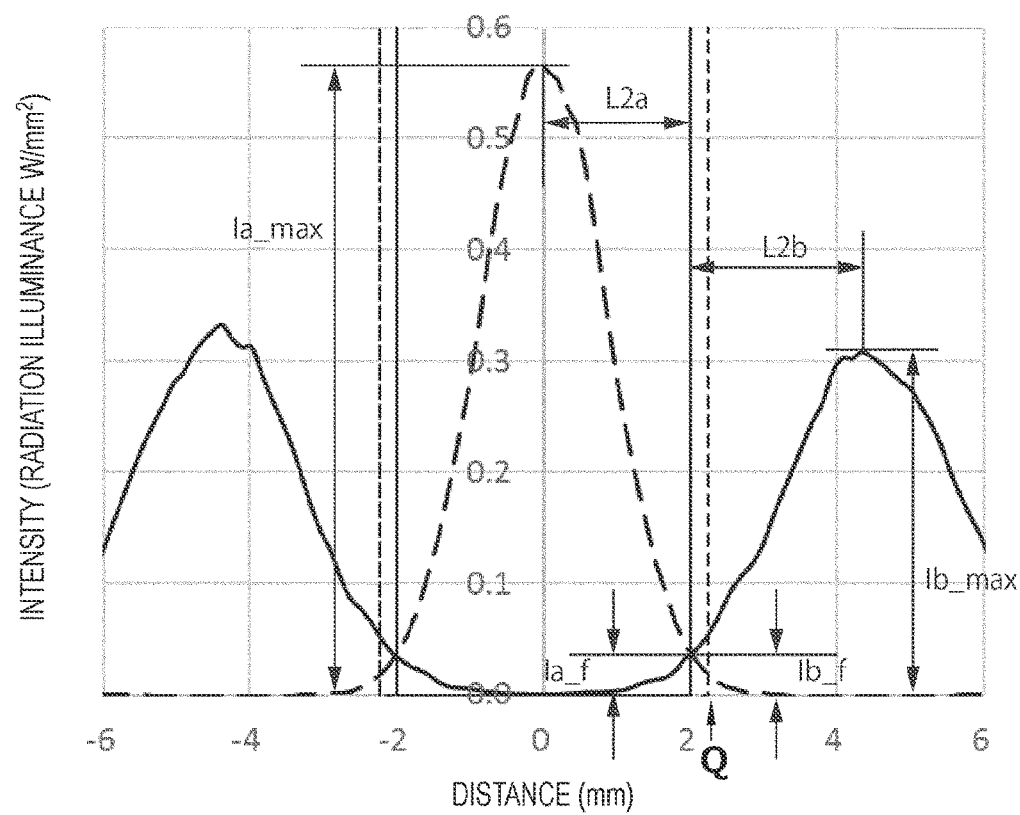
FIG. 2B is a graph illustrating an example of a relationship between a position along the straight line M and an intensity of an incident light beam from a single light source.

$(Ia\_f/Ia\_max) > 0.01$     Formula 4B:

$(Ib\_f/Ib\_max) > 0.01$     Formula 5B:

$0.5 < ((Ib\_f/Ib\_max)/(Ia\_f/Ia\_max)) < 2.0$     Formula 6B:

However, as illustrated in FIGS. 2A and 2B, Ia_max is a maximum intensity (W/mm$^2$) of a first light source light beam derived from one single light source 5 (a first single light source) selected from the first light source assembly 4a. Ib_max is a maximum intensity of a second light source light beam derived from one single light source 5 (a second single light source) selected from the second light source assembly. The second light source light beam is a light source light beam whose optical axis is adjacent to the first light source light beam at a closest position. Ia_f and Ib_f are at positions on a straight line M and are an intensity of the first light source light beam and an intensity (W/mm$^2$) of the second light source light beam, respectively, at a position to be a boundary between the transmission surface and the reflection surface.

Note that FIG. 2B is a graph illustrating an example of a profile of an incident light intensity along the straight line M in FIG. 2A. The incident light intensity mentioned here is an intensity of a light beam incident on the plate-shaped optical unit 3. Furthermore, the profile of the incident light intensity indicates a profile of an incident light intensity of the light source light beam Lwa from the first light source assembly 4a and a profile of an incident light intensity of the light source light beam Lwb from the second light source assembly 4b, on the surface 33b of the plate-shaped optical unit 3. In the example of the profile of the incident light intensity, a horizontal axis indicates a separation distance (mm) from an origin along the straight line M, with a position, as the origin, giving a maximum intensity of the first light source light beam derived from the first single light source. A vertical axis represents the incident light intensity. The incident light intensity is specified by, for example, measurement of a radiation density (W/mm$^2$) of the light source light beam Lw on the surface 33b of the plate-shaped optical unit 3.

The straight line M indicates a straight line connecting a first intensity center G1a and a second intensity center G1b. The first intensity center G1a indicates a center position of an incident light intensity derived from the first single light source in the incident light intensity distribution formed by the light source light beam Lwa from the first light source assembly 4a. The second intensity center G1b indicates a center position of an incident light intensity derived from the second single light source.

In the illumination device 1a according to the first embodiment, a shape of the boundary 8 between the transmission surface 6 and the reflection surface 7 is formed in a smooth wave shape.

Figure 13A:
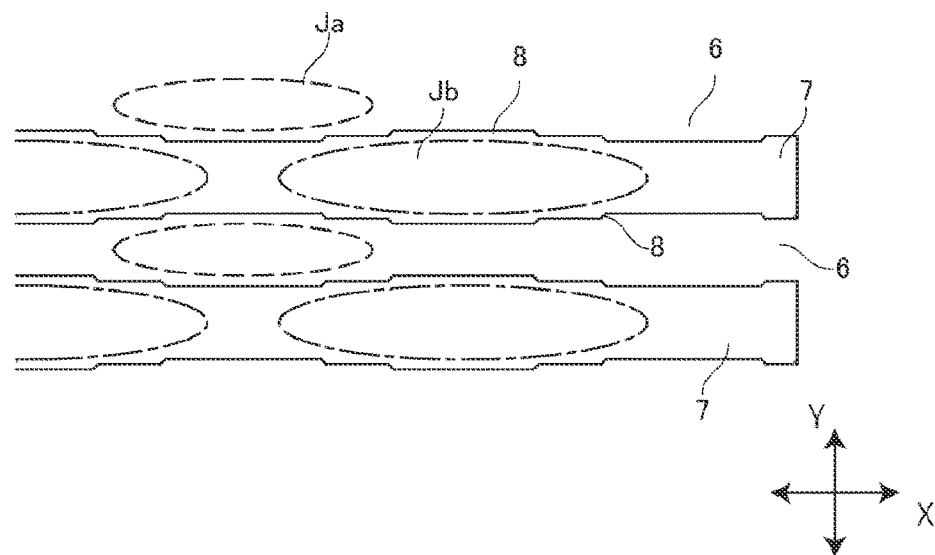
FIGS. 13A and 13B are views illustrating an example in which a part of a formation pattern of the transmission surface and the reflection surface is enlarged.
Figure 13B:
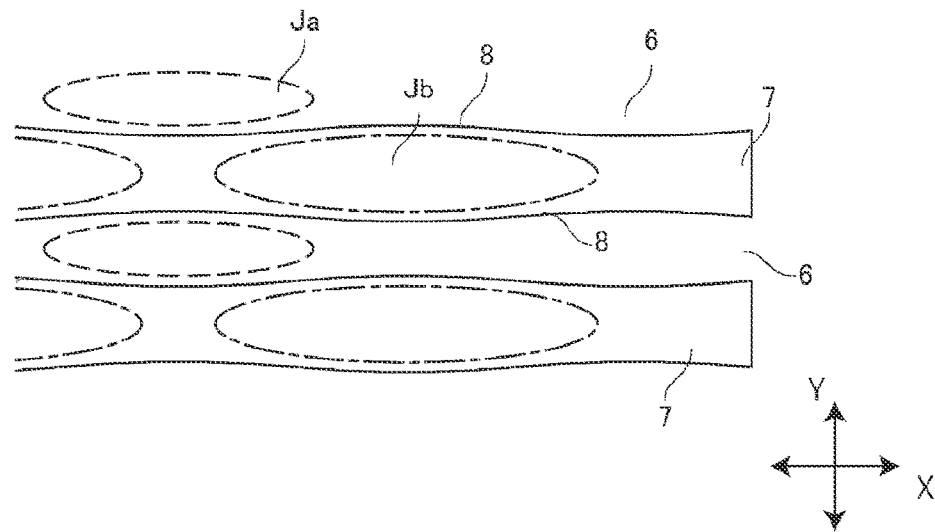

However, in the illumination device 1a according to the first embodiment, the shape of the boundary 8 between the transmission surface 6 and the reflection surface 7 is not limited to the smooth curve as long as the conditions 1 to 3 described above are satisfied in a case where the condition A described above is satisfied, and the conditions 4 to 6 described above are satisfied in a case where the above condition B is satisfied. That is, the shape of the boundary 8 between the transmission surface 6 and the reflection surface 7 may draw a smooth curve as illustrated in FIG. 13B, or may be formed in a polygonal line as illustrated in FIG. 13A.

(Formation of Plate-Shaped Optical Unit 3)

The plate-shaped optical unit 3 can be specifically obtained, for example, by sectioning and forming the transmission surface 6 and the reflection surface 7 as follows. First, a sheet having optical transmissivity is prepared. A material of the sheet is only required to be appropriately selected in accordance with a purpose. Next, a light reflecting film is formed in a region corresponding to the reflection surface 7 on a surface of the sheet, and the plate-shaped optical unit 3 is obtained. The region corresponding to the reflection surface 7 can be specified by the boundary 8 between the transmission surface 6 and the reflection surface 7 determined according to the above. In this case, in the plate-shaped optical unit 3, the reflection surface 7 includes a light reflecting film, and the transmission surface 6 includes a non-formation region of the light reflecting film. The light reflecting film is only required to be a film having a property of reflecting light, and examples thereof include a metal film and a dielectric multilayer film.

(Effect)

Figure 17:
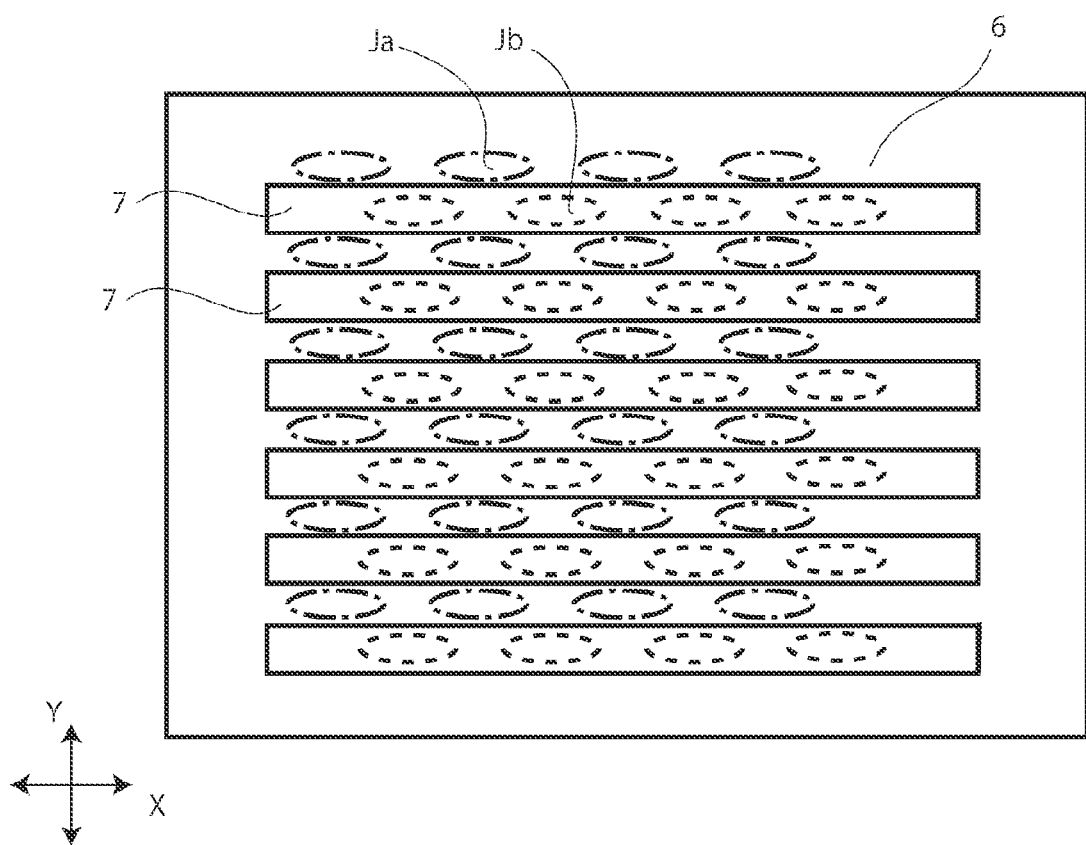
FIG. 17 is a view illustrating a plate-shaped optical unit in an illumination device according to related art.

According to the illumination device 1a of the first embodiment, the boundary 8 between the transmission surface 6 and the reflection surface 7 is defined at a position where an incident light intensity of the light source light beam Lwa from the single light source 5 of the first light source assembly 4a and an incident light intensity of the light source light beam Lwb of the single light source 5 of the second light source assembly adjacent to the single light source 5 have substantially equal values. For example, in the example of the illumination device illustrated in FIG. 1A, the boundary 8 between the transmission surface 6 and the reflection surface 7 is formed in a corrugated shape, and the reflection surface 7 is formed in a corrugated belt-shaped region. In a case where a conventional reflector is used in this example (a conventional example), in place of the plate-shaped optical unit 3, a reflector is to be used in which a boundary between a transmission surface and a reflection surface is changed from a corrugated shape to a linear shape, and the reflection surface 7 is made into a rectangular region, as illustrated in FIG. 17. In a case where the conventional example and the example of the illumination device illustrated in FIG. 1A are compared, the illumination device illustrated in FIG. 1A has a higher ratio of an amount of light used as emitted light to an amount of light incident on the plate-shaped optical unit from the light source assembly. This indicates that, in the illumination device of the first embodiment, more light can be emitted even without requiring an increase of a luminous flux size, as compared with the case of using the conventional reflector.

As described above, according to the illumination device of the first embodiment, it is possible to obtain one that can further reduce a size of an emitted luminous flux while increasing light emission efficiency (a ratio of an amount of light used as emitted light to an amount of light incident on the plate-shaped optical unit from the light source assembly). Moreover, in the illumination device of the first embodiment, since the plate-shaped optical unit is only required to have the reflection surface and the transmission surface to be formed, the light emission efficiency can be enhanced without requiring the use of a complicated structure.

Modified Example 1 of First Embodiment

Figure 3A:
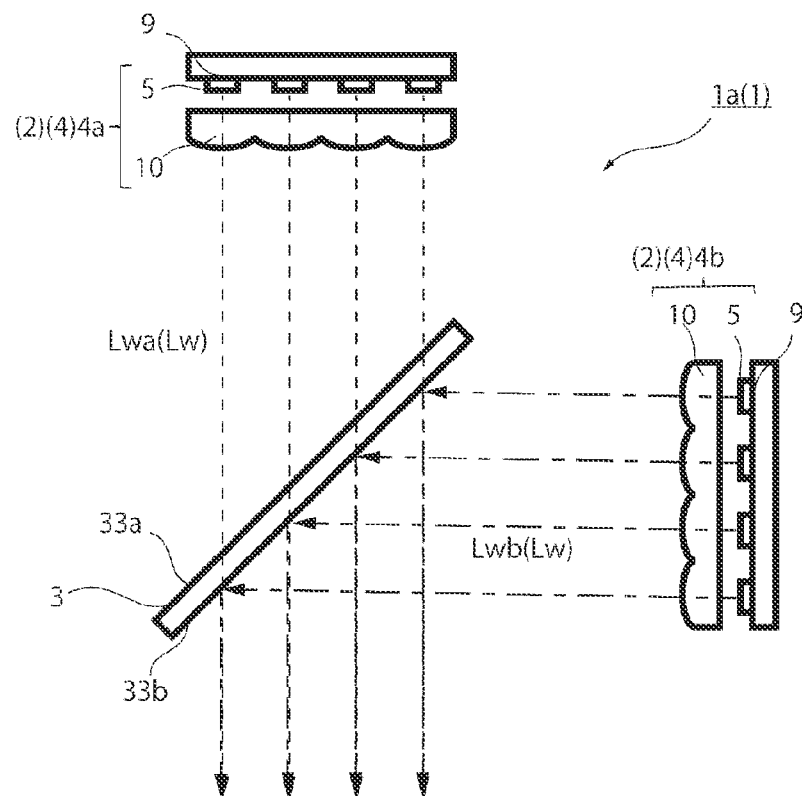
FIG. 3A is a view illustrating an example of a configuration of the illumination device according to the first embodiment.

Regarding the incident light intensity distribution in the illumination device 1a of the first embodiment, a description has been given to, as an example, a case where the intensity center Ga determined in the incident light intensity distribution of the first light source assembly and the intensity center Gb determined in the incident light intensity distribution of the second light source assembly are alternately arranged in the oblique direction. The illumination device 1a of the first embodiment is not limited to this, and, as illustrated in the examples of FIGS. 3A and 3B, the incident light intensity distribution of the first light source assembly and the incident light intensity distribution of the second light source assembly may have a distribution in which the intensity center Ga determined in the incident light intensity distribution of the first light source assembly and the intensity center Gb determined in the incident light intensity distribution of the second light source assembly are alternately arranged in the vertical direction. In this case, the illumination device 1a of the first embodiment can be easily used as a light source optical unit of an illumination device of a second embodiment to be described later (FIG. 9B).

Modified Example 2 of First Embodiment

Figure 5:
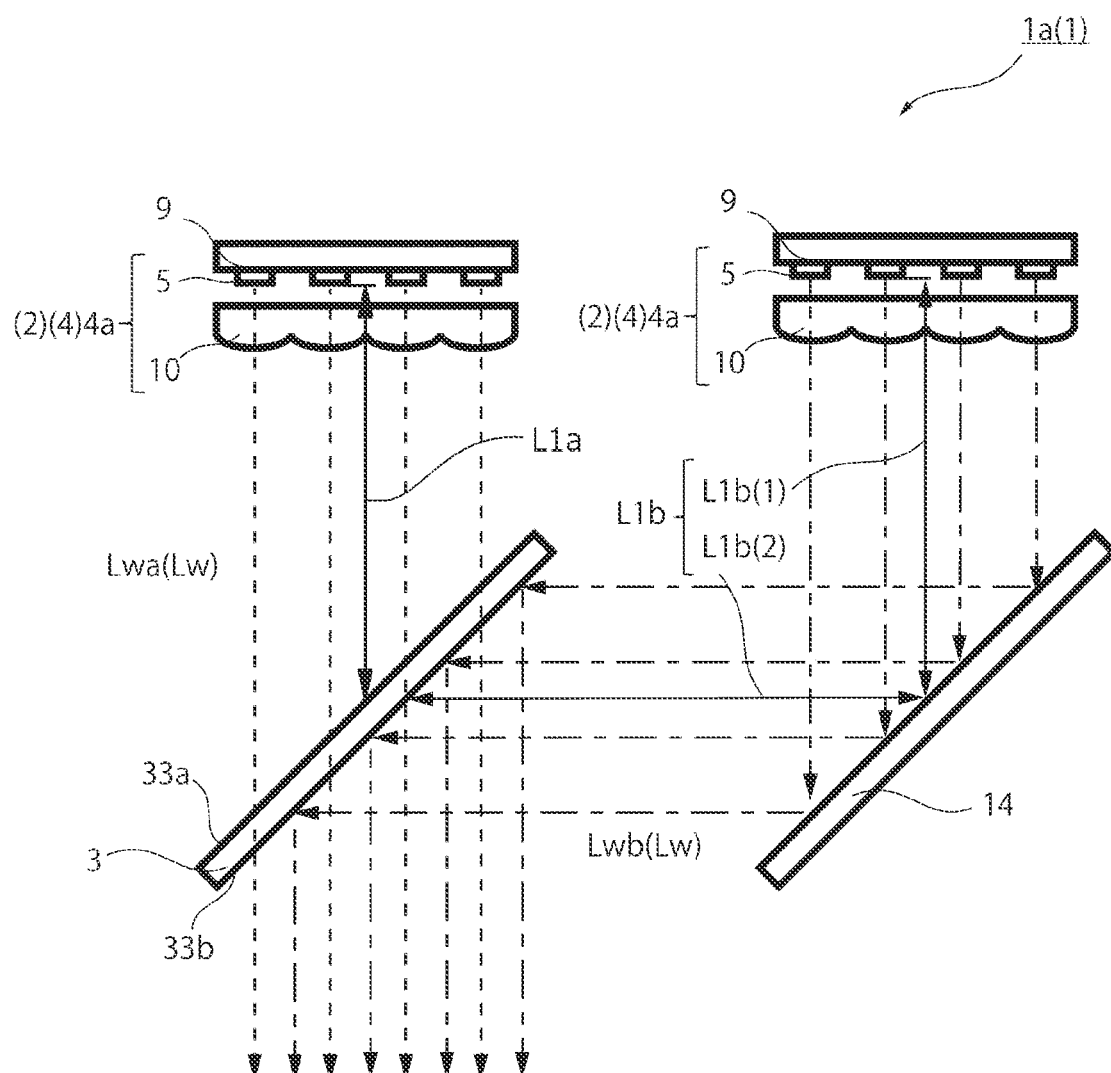
FIG. 5 is a view illustrating an example of a combination of a path of a light source light beam from a light source assembly toward a transmission surface of the plate-shaped optical unit and a path of a light source light beam from the light source assembly toward a reflection surface of the plate-shaped optical unit, in the example of the illumination device according to the first embodiment.

A description has been given to a case where a light beam incident on the plate-shaped optical unit 3 is direct light emitted from the light source assembly 4, as an example, but the present invention is not limited to this. As illustrated in FIG. 5, a light beam reflected by a mirror 14 may be incident on the plate-shaped optical unit 3. In a case where the light source light beam Lw directed from the light source assembly 4 to the plate-shaped optical unit 3 is a light beam reflected by the mirror 14, an optical path length from the light source assembly 4 to the plate-shaped optical unit 3 can be changed, and the incident light intensity distribution can be finely adjusted by adjustment or the like of the number of the mirrors 14 to be installed.

An optical path length between light source assembly 4 and plate-shaped optical unit 3 indicates a distance from a light emission surface of the single light source 5 of the light source assembly 4 to the plate-shaped optical unit 3 along a traveling direction of a light beam, with a center of a total luminous flux of a light source light beam constituting the light source assembly 4 as a reference position. In the example of FIG. 5, an optical path length L1b between the second light source assembly 4b and the plate-shaped optical unit 3 is specified by L1b (1)+L1b (2). Note that, in the example of FIG. 5, an optical path length between the first light source assembly 4a and the plate-shaped optical unit 3 is L1a.

Note that, in a case where an optical path length between the second light source assembly 4b and the plate-shaped optical unit 3 is larger than an optical path length between the first light source assembly 4a and the plate-shaped optical unit 3, it is preferable that the boundary 8 between the transmission surface 6 and the reflection surface 7 is defined such that a distance L2b from the second intensity center G1b to the boundary 8 along the straight line M is larger than a distance L2a from the first intensity center G1a to the boundary 8 along the straight line M, from the viewpoint of improving a balance between intensities of the light source light beam Lwa from the first light source assembly 4a and the light source light beam Lwb from the second light source assembly 4b. From the same viewpoint, in a case where an optical path length between the second light source assembly 4b and the plate-shaped optical unit 3 is smaller than an optical path length between the first light source assembly 4a and the plate-shaped optical unit 3, it is preferable that the boundary 8 between the transmission surface 6 and the reflection surface 7 is defined such that the distance L2b from the second intensity center G1b to the boundary 8 along the straight line M is smaller than the distance L2a from the first intensity center G1a to the boundary 8 along the straight line M.

Modified Example 3 of First Embodiment

In the illumination device 1a of the first embodiment, in a case where a value Ia_max/Pa is larger than a value Ib_max/Pb, the distance Lb2 is preferably larger than the distance L2a from the viewpoint of enhancing the light emission efficiency. Furthermore, from the same viewpoint, in the illumination device 1a of the first embodiment, in a case where the value Ia_max/Pa is smaller than the value Ib_max/Pb, the distance Lb2 is preferably smaller than the distance L2a.

The value Ia_max/Pa is a value obtained by dividing an intensity (a maximum intensity) Ia_max at the first intensity center G1a by incident power (hereinafter, simply referred to as power) Pa derived from the first single light source. The value Ib_max/Pb is a value obtained by dividing a maximum intensity Ib_max at the second intensity center G1b by power Pb derived from the second single light source. Note that the power Pa and the power Pb are relative ratio values. That is, one of Pa and Pb is set to 1.0, and another one is specified as a relative value.

Modified Example 4 of First Embodiment

In the example of the illumination device 1a of FIG. 1A, the first light intensity distribution Ja and the second light intensity distribution Jb recognized when light beams from the first light source assembly and the second light source assembly are incident on the surface 33b of the plate-shaped optical unit 3 have an anisotropic contour shape in which directions are the same. However, the illumination device 1a of the first embodiment is not limited to this.

Figure 6A:
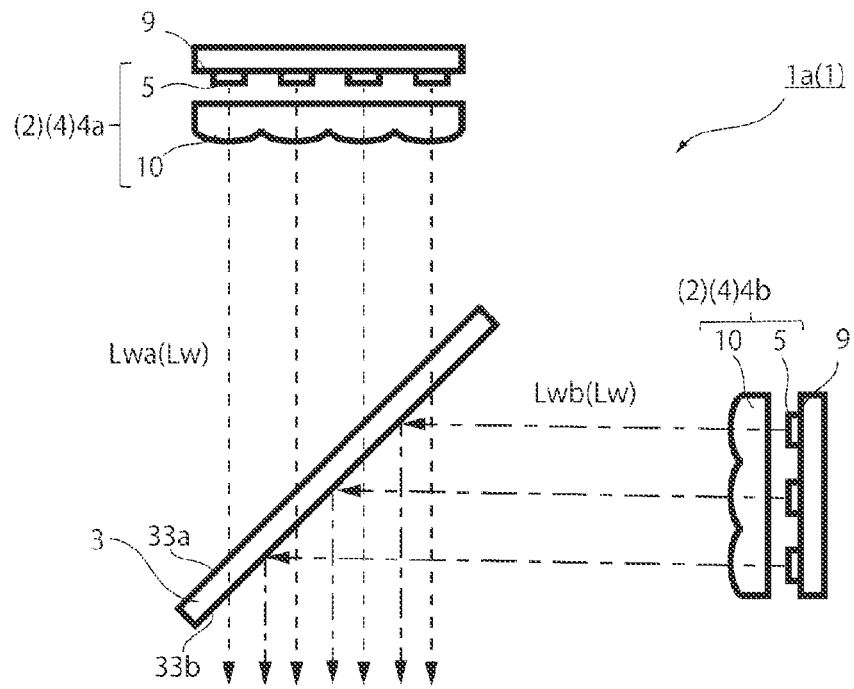
FIG. 6A is a view illustrating an example of a configuration of the illumination device according to the first embodiment.
Figure 6B:
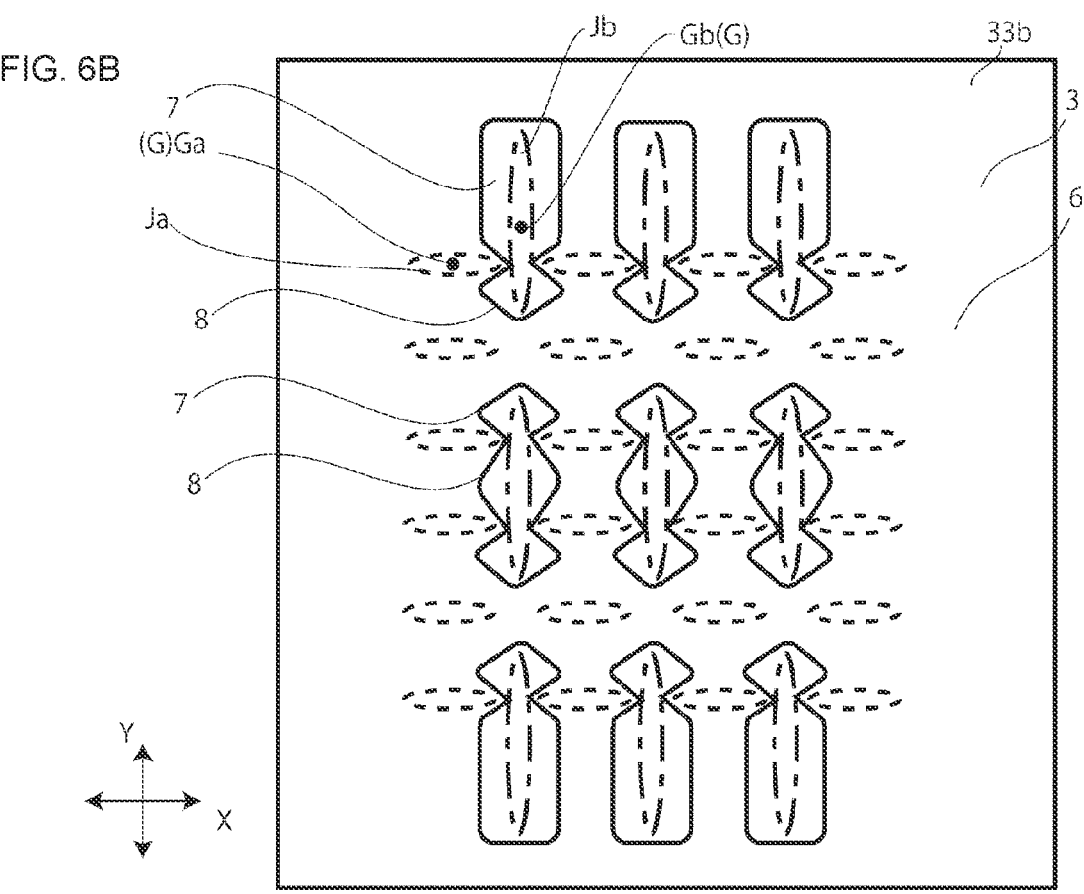
FIG. 6B is a view illustrating an example of a light intensity distribution of a light source light beam incident on a plate-shaped optical unit and an example of a formation pattern of a transmission surface and a reflection surface, in the example of the illumination device illustrated in FIG. 6A.

That is, as illustrated in FIGS. 6A and 6B, the first light source assembly and the second light source assembly may be arranged such that the first light intensity distribution Ja and the second light intensity distribution Jb recognized on the surface 33b of the plate-shaped optical unit 3 have an anisotropic contour shape in which directions are different from each other. In the examples of FIGS. 6A and 6B, in comparison between the first light intensity distribution Ja and the second light intensity distribution Jb, both have a distribution having an elliptical contour shape, and major axis directions are different from each other.

In this case, the boundary 8 is formed so as to surround a periphery of the second light intensity distribution Jb, and a part or the whole of the boundary 8 has a corrugated shape.

By including such an illumination device in the first embodiment, a degree of freedom in designing the first light source assembly and the second light source assembly can be further improved.

2. Second Embodiment (Illumination Device 1b)

Figure 9A:
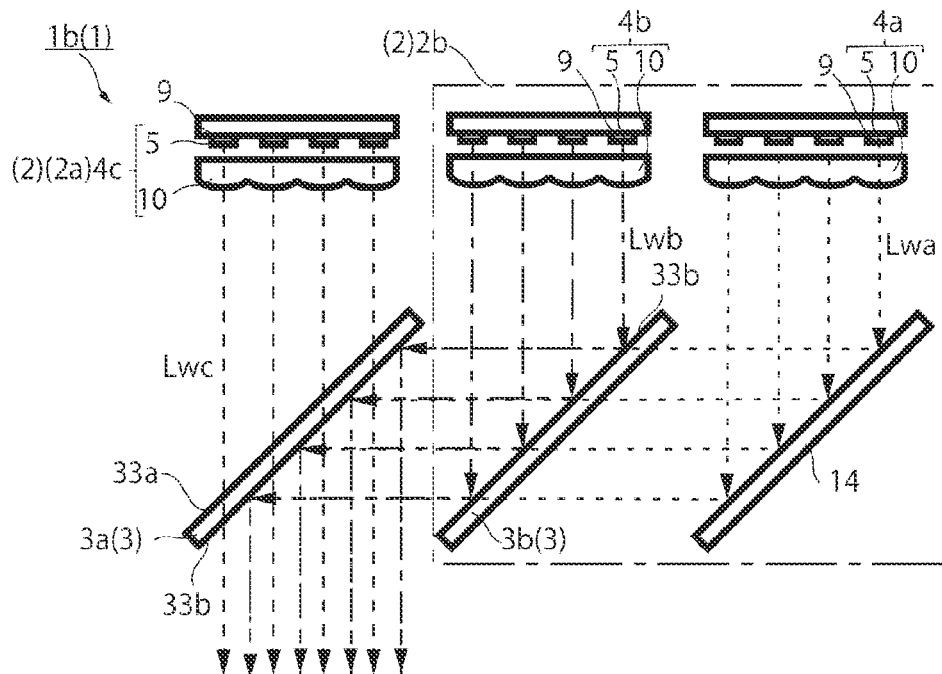
FIG. 9A is a view illustrating an example of a configuration of the illumination device according to the second embodiment.
Figure 9B:
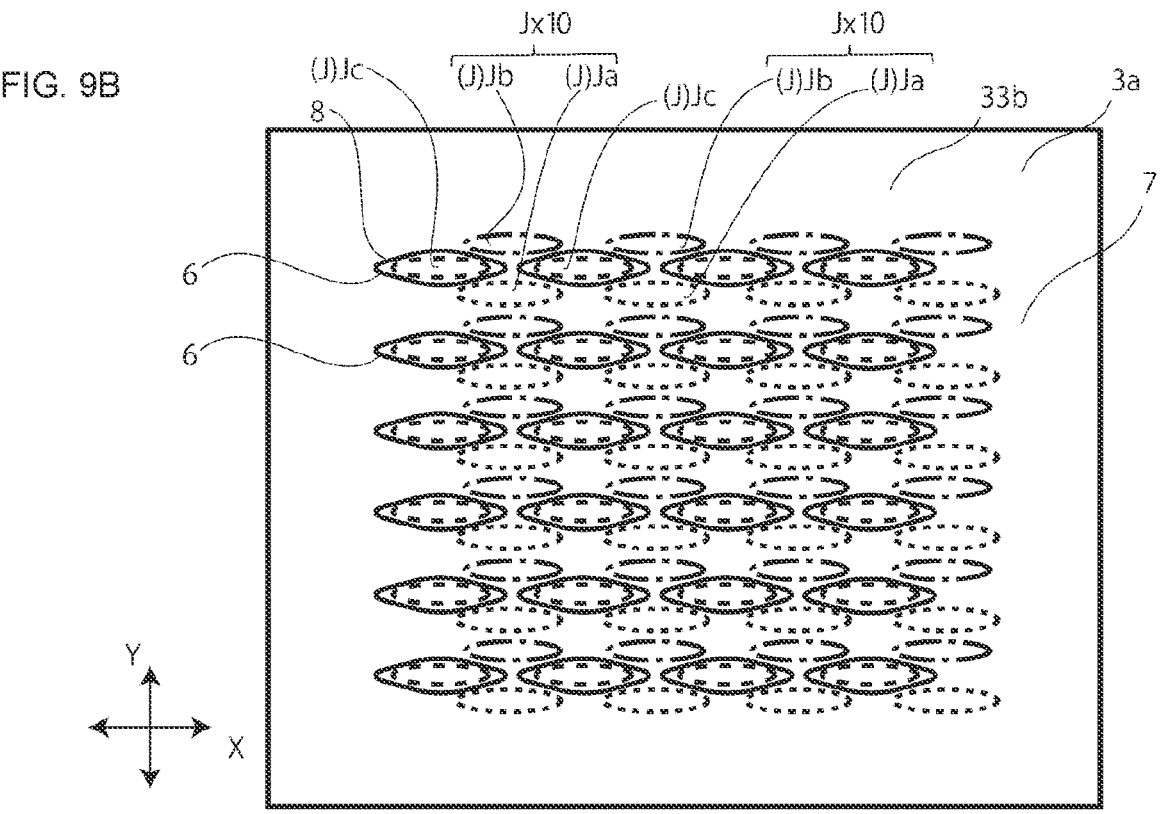
FIG. 9B is a view illustrating an example of a light intensity distribution of a light source light beam incident on a first plate-shaped optical unit and an example of a formation pattern of a transmission surface and a reflection surface, in the example of the illumination device illustrated in FIG. 9A.

FIG. 9A is a view illustrating an example of a configuration of an illumination device 1b (1) according to the second embodiment. The illumination device 1b includes a plurality of light source optical units 2 and a first plate-shaped optical unit 3a (3). Similarly to the first embodiment, the individual light source optical units 2 emit individual light beams derived individually from a plurality of single light sources 5, in a state where directions are aligned with each other. In the example of the illumination device 1b of FIG. 9A, a first light source optical unit 2a and a second light source optical unit 2b are provided as the light source optical units 2. In the illumination device 1b, the illumination device 1a according to the first embodiment is adopted as at least one of the light source optical units 2.

(Traveling Path of Light Source Light Beam Lw)

In the illumination device 1b, light beams emitted individually from the plurality of light source optical units 2 are incident on the first plate-shaped optical unit 3a. The light beams are incident on the first plate-shaped optical unit 3a from mutually different directions. Further, the light beam passes through a transmission surface 6 of the first plate-shaped optical unit 3a or is reflected by a reflection surface 7 of the first plate-shaped optical unit 3a, in accordance with a position where the light beam is incident on the first plate-shaped optical unit 3a. A light beam from the first light source optical unit 2a is incident from a one surface 33a side of the first plate-shaped optical unit 3a and passes toward an another surface 33b side. A light beam from the second light source optical unit 2b is incident on the surface 33b side of the first plate-shaped optical unit 3a and is reflected on the surface 33b side. The light source light beam having passed through the transmission surface 6 of the first plate-shaped optical unit 3a forms transmitted light, and the light source light beam reflected by the reflection surface 7 of the first plate-shaped optical unit 3a forms reflected light. In the illumination device 1a, the transmitted light and the reflected light are emitted in a direction away from the first plate-shaped optical unit 3a in a state where directions are aligned with each other.

(Light Source Optical Unit 2a)

In the example of the illumination device 1b of FIG. 9A, the second light source optical unit 2b is an optical system having the same configuration as that of the illumination device 1a according to the first embodiment.

Specifically, the second light source optical unit 2b includes a first light source assembly 4a and a second light source assembly 4b, and a second plate-shaped optical unit 3b configured to transmit a light source light beam from the first light source assembly 4a and reflect a light source light beam from the second light source assembly 4b is arranged. Here, in order to distinguish from the first plate-shaped optical unit 3a described above, the plate-shaped optical unit 3 included in the second light source optical unit 2b is described as the second plate-shaped optical unit 3b.

The second light source optical unit 2b emits a light source light beam Lwa from the first light source assembly 4a and a light source light beam Lwb from the second light source assembly 4b, to the first plate-shaped optical unit 3a in a state where light traveling methods are aligned with each other.

The first light source optical unit 2a includes a third light source assembly 4c. The first light source optical unit 2a emits a light source light beam Lwc from the third light source assembly 4c, to the first plate-shaped optical unit 3a in a state where light traveling methods are aligned with each other. As the third light source assembly 4c, one that can be used as the light source assembly 4 of the illumination device 1a according to the first embodiment is adopted.

(First Plate-Shaped Optical Unit 3a)

Similarly to the plate-shaped optical unit of the illumination device of the first embodiment, the first plate-shaped optical unit 3a has a configuration sectioned into the reflection surface 7 and the transmission surface 6 in accordance with an incident light intensity distribution of a light beam from the light source optical unit 2 (FIG. 9B). The reflection surface 7 and the transmission surface 6 are formed on the surface 33b (a light emission surface) on an emission surface side of transmitted light and reflected light derived from light source light beams, among surfaces of the first plate-shaped optical unit 3a.

An incident light intensity distribution of a light beam from the light source optical unit 2 is specified as a distribution indicating a relationship between a position on the surface 33b of the plate-shaped optical unit 3 and an intensity of the light source light beam.

An incident light intensity distribution of a light beam from the second light source optical unit 2b is a combination of an incident light intensity distribution of the light source light beam Lwa of the first light source assembly 4a and an incident light intensity distribution of the light source light beam Lwb of the second light source assembly 4b. The incident light intensity distribution of the light source light beam Lwa of the first light source assembly 4a and the incident light intensity distribution of the light source light beam Lwb of the second light source assembly 4b are determined such that the first light intensity distribution Ja and the second light intensity distribution Jb adjacent to each other in the vertical direction are alternately arranged, and combination units Jx10 of the first light intensity distribution Ja and the second light intensity distributions Jb are arranged in a lattice shape as the entire arrangement of the light intensity distributions.

The incident light intensity distribution of the light beam Lwc from the first light source optical unit 2a is determined in accordance with an arrangement of a light intensity distribution (a third light intensity distribution Jc) of a light source light beam derived from a single light source of the third light source assembly 4c. The third light intensity distributions Jc are arranged in a lattice shape, and the third light intensity distribution Jc is determined such that the third light intensity distribution Jc and the combination unit Jx10 of the first light intensity distribution Ja and the second light intensity distribution Jb are alternately arranged in the horizontal direction.

(Boundary 8 Between Transmission Surface 6 and Reflection Surface 7)

A boundary 8 between the transmission surface 6 and the reflection surface 7 in the first plate-shaped optical unit 3a is defined at a position where incident light intensities of light beams from the individual light source optical units 2 have substantially equal values.

In the second embodiment in which the illumination device of the first embodiment is used, a light beam incident on the first plate-shaped optical unit 3a from the second light source optical unit 2b is a combination of light source light beams from a plurality of light source assemblies. Therefore, there may be a state where a plurality of types of light beams is adjacent to a light source light beam from the first light source optical unit. As described above, in a case where a plurality of types of light source light beams is adjacent to one type of light source light beam, one light source light beam is reflected by the first plate-shaped optical unit, and another light source light beam is transmitted, a position at which the incident light intensities of the light beams from the individual light source optical units have substantially equal values is defined as follows. That is, on the basis of an incident light intensity of one light source light beam selected according to incident light intensities of light source light beams from the plurality of light source assemblies and an incident light intensity of a light source light beam from the first light source optical unit, the position at which the incident light intensities of the light beams from the individual light source optical units have substantially equal values is defined.

For example, regarding the illumination device of FIG. 9A, a description will be further given to, as an example, a case where the first light source assembly 4a in the second light source optical unit 2b is a green light source (a G light source), the second light source assembly 4b is a red light source (an R light source), and the third light source assembly 4c in the first light source optical unit 2a is a blue light source (a B light source). In this case, in an incident light intensity distribution based on a light beam from the second light source optical unit 2b, for a region where the incident light intensity of the G light source is strong among the incident light intensities of the G light source and the R light source, the boundary 8 between the transmission surface 6 and the reflection surface 7 is defined at a position where the incident light intensity based on the incident light intensity distribution of the G light source and the incident light intensity based on the incident light intensity distribution of the B light source have substantially equal values to each other.

For a region where the incident light intensity of the R light source is strong among the incident light intensities of the G light source and the R light source, the boundary 8 between the transmission surface 6 and the reflection surface 7 is defined at a position where the incident light intensity based on the incident light intensity distribution of the R light source and the incident light intensity based on the incident light intensity distribution of the B light source have substantially equal values to each other.

As described in the first embodiment, the position where the incident light intensities have substantially equal values indicates a position where Formulas 1A to 3A are satisfied in a case where a condition A is satisfied, and Formulas 3A to 6A are satisfied in a case where a condition B is satisfied. Furthermore, similarly to the first embodiment, it is preferable that the position where the incident light intensities have substantially equal values is a position where Formulas 1B to 3B are satisfied in a case where the condition A is satisfied and Formulas 4B to 6B are satisfied in a case where the condition B is satisfied.

In the example of the illumination device 1b illustrated in FIG. 9A, in the first plate-shaped optical unit 3a, the transmission surface 6 and the reflection surface 7 are formed such that the transmission surface 6 is formed in a region surrounding a periphery of the individual third light intensity distribution Jc and an outside of the transmission surface 6 entirely forms the reflection surface 7.

According to the illumination device 1b of the second embodiment, it is possible to obtain one capable of further reducing a size of an emitted luminous flux while increasing a ratio of an amount of light used as emitted light to an amount of light incident on the plate-shaped optical unit 3 from the light source optical unit 2. Moreover, according to the illumination device of the second embodiment, it is possible to emit light beams derived from three or more types of light sources in a state where directions are aligned with each other. For example, when the R light source, the G light source, and the B light source are selected as the three types of light sources, an RGB light source can be formed.

Modified Example 1 of Second Embodiment

Figure 8A:
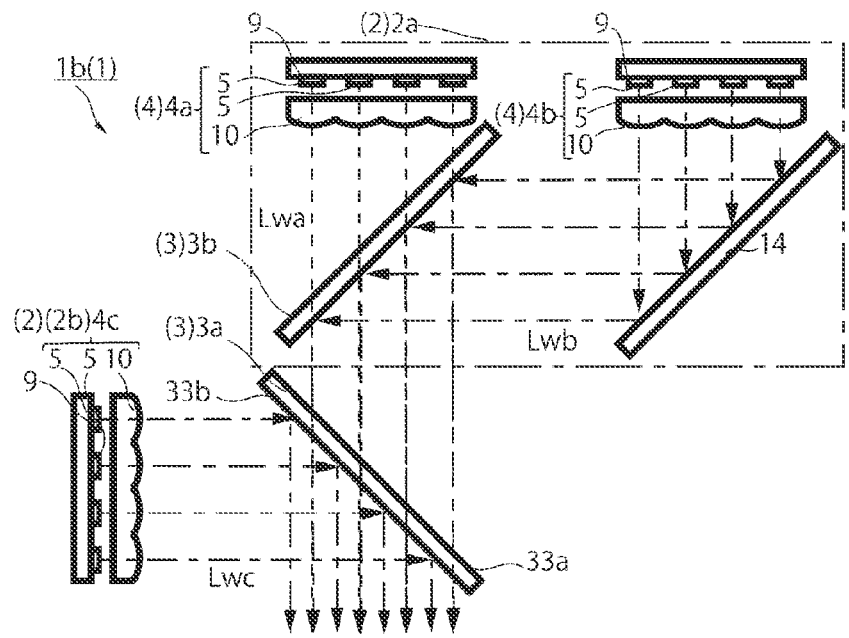
FIG. 8A is a view illustrating an example of a configuration of an illumination device according to a second embodiment.

In the example of the illumination device of FIG. 9A, the second light source optical unit 2b is the illumination device 1a according to the first embodiment, and the first light source optical unit is the third light source assembly. The illumination device of the second embodiment is not limited to this, and, as illustrated in FIG. 8A, the first light source optical unit 2a may be the illumination device 1a according to the first embodiment, and the second light source optical unit 2b may be the third light source assembly 4c.

Figure 8B:
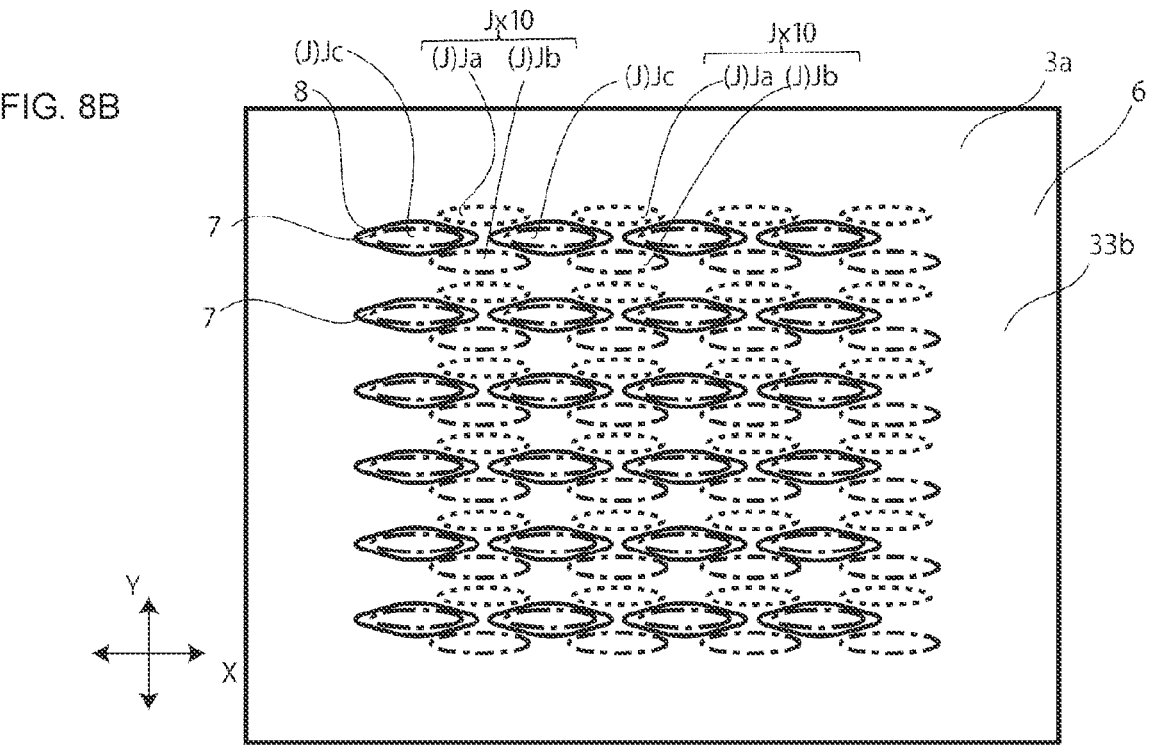
FIG. 8B is a view illustrating an example of a light intensity distribution of a light source light beam incident on a first plate-shaped optical unit and an example of a formation pattern of a transmission surface and a reflection surface, in the example of the illumination device illustrated in FIG. 8A.

Also in this case, similarly to the plate-shaped optical unit of the illumination device of the first embodiment, the first plate-shaped optical unit 3a has a configuration sectioned into the reflection surface 7 and the transmission surface 6 in accordance with an incident light intensity distribution of a light beam from the light source optical unit 2 (FIG. 8B).

An incident light intensity distribution of a light beam from the first light source optical unit 2a is a combination of an incident light intensity distribution of the light source light beam Lwa of the first light source assembly 4a and an incident light intensity distribution of the light source light beam Lwb of the second light source assembly 4b. The incident light intensity distribution of the light source light beam Lwa of the first light source assembly 4a and the incident light intensity distribution of the light source light beam Lwb of the second light source assembly 4b are determined such that the first light intensity distribution Ja and the second light intensity distribution Jb adjacent to each other in the vertical direction are alternately arranged, and the combination units Jx10 of the first light intensity distribution Ja and the second light intensity distributions Jb are arranged in a lattice shape as the entire arrangement of the light intensity distributions. In the example of the illumination device of FIG. 8A, unlike the example of the illumination device of FIG. 9A, positions of the first light intensity distribution Ja and the second light intensity distribution Jb are reversed.

The incident light intensity distribution of the light beam Lwc from the second light source optical unit 2b is determined according to an arrangement of a light intensity distribution (the third light intensity distribution Jc) of a light source light beam derived from a single light source of the third light source assembly 4c. The third light intensity distributions Jc are arranged in a lattice shape, and the third light intensity distribution Jc is determined such that the third light intensity distribution Jc and the combination unit Jx10 of the first light intensity distribution Ja and the second light intensity distribution Jb are alternately arranged in the horizontal direction.

A transmission surface and a reflection surface of the plate-shaped optical unit in the example of the illumination device 1b illustrated in FIG. 8A are in a state where the transmission surface and the reflection surface in the example of the illumination device of FIG. 9A are reversed as illustrated in FIG. 8B.

Modified Example 2 of Second Embodiment

Figure 10A:
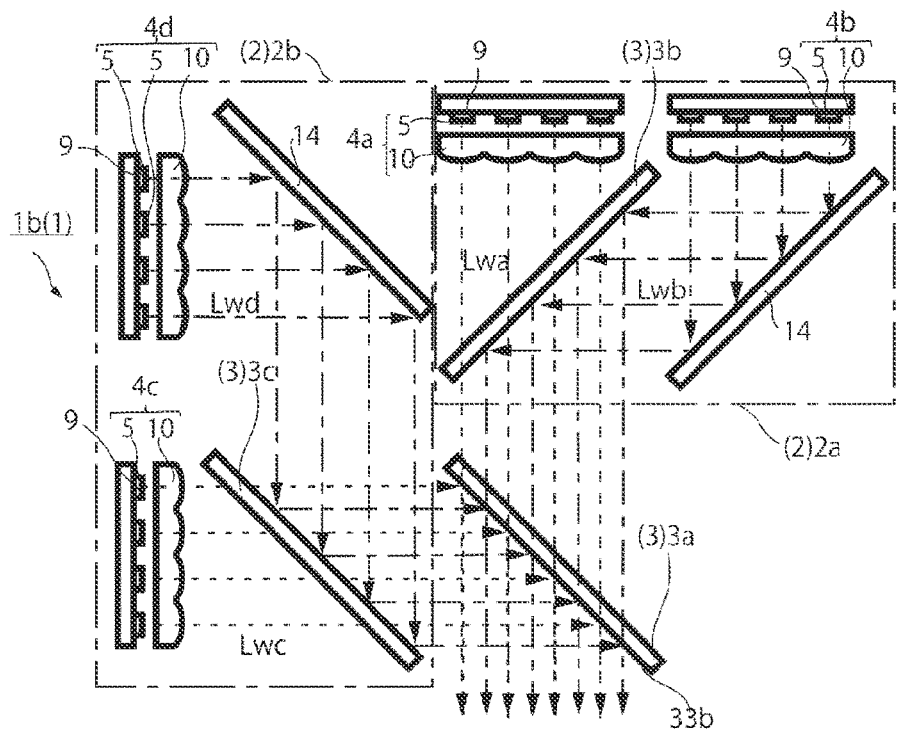
FIG. 10A is a view illustrating an example of a configuration of the illumination device according to the second embodiment.

In the illumination device 1b of the second embodiment, as illustrated in FIG. 10A, both the first light source optical unit 2a and the second light source optical unit 2b may be the illumination device 1a according to the first embodiment.

Specifically, the first light source optical unit 2a includes the first light source assembly 4a and the second light source assembly 4b, and the second plate-shaped optical unit 3b configured to transmit the light source light beam Lwa from the first light source assembly 4a and reflect the light source light beam Lwb from the second light source assembly 4b is arranged. The second light source optical unit 2b includes the third light source assembly 4c and a fourth light source assembly 4d, and a third plate-shaped optical unit 3c configured to transmit the light source light beam Lwc from the third light source assembly 4c and reflect a light source light beam Lwd from the fourth light source assembly 4d is arranged. As the third light source assembly 4c and the fourth light source assembly 4d, light source assemblies having configurations similar to those of the first light source assembly 4a and the second light source assembly 4b may be used. Similarly to the second plate-shaped optical unit 3b, the third plate-shaped optical unit 3c may have a configuration in which a boundary between a transmission surface and a reflection surface is formed on the basis of an incident light intensity distribution of a light beam from the light source optical unit 2.

The first light source optical unit 2a emits the light beam Lwa from the first light source assembly 4a and the light beam Lwb from the second light source assembly 4b, to the first plate-shaped optical unit 3a, in a state where light traveling methods are aligned with each other by the second plate-shaped optical unit 3b. Note that the light beam Lwb from the second light source assembly 4b is reflected by a mirror 14 and is incident on the second plate-shaped optical unit 3b.

Figure 11A:
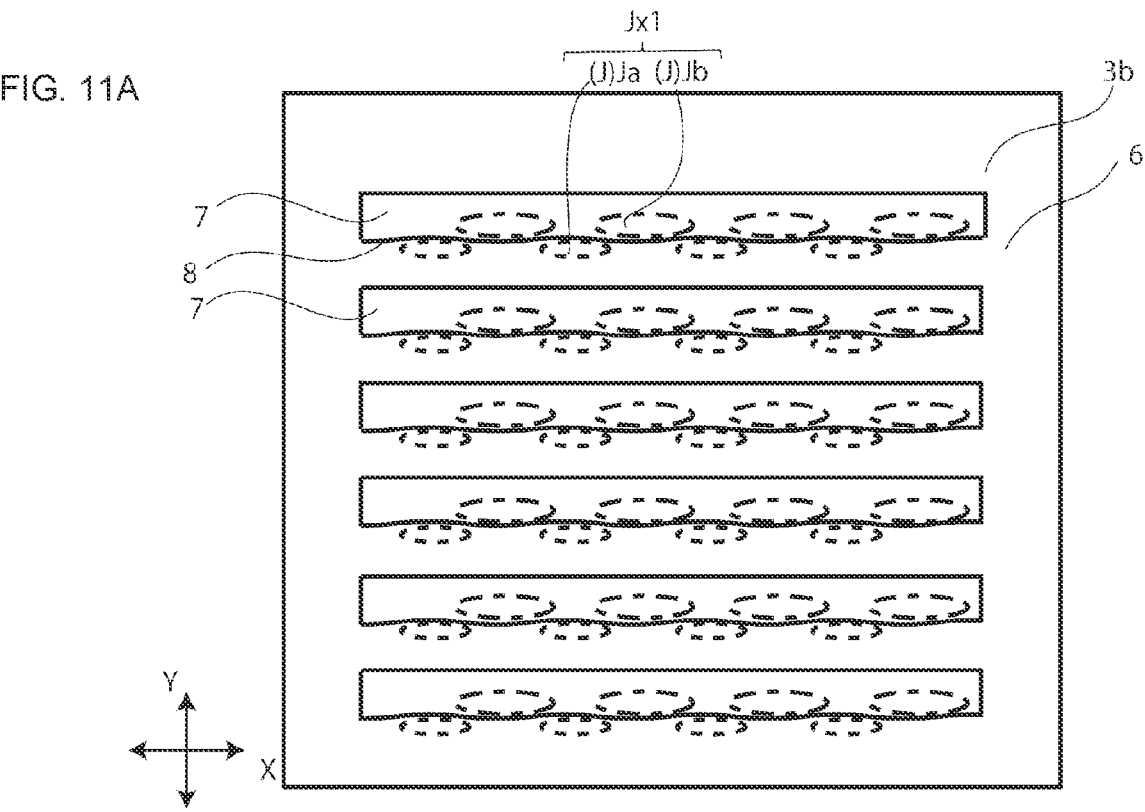
FIG. 11A is a view illustrating an example of a light intensity distribution of a light source light beam incident on a second plate-shaped optical unit arranged in a light source optical unit and an example of a formation pattern of a transmission surface and a reflection surface, in an example of a configuration of the illumination device according to the second embodiment.

In the first light source optical unit 2a, the transmission surface 6 and the reflection surface 7 of the second plate-shaped optical unit 3b are formed as illustrated in FIG. 11A. The boundary 8 between the transmission surface 6 and the reflection surface 7 of the second plate-shaped optical unit 3b is defined as described in the first embodiment.

The second light source optical unit 2b emits the light beam Lwc from the third light source assembly 4c and the light beam Lwd from the fourth light source assembly 4d, to the first plate-shaped optical unit 3a in a state where light traveling methods are aligned with each other by the third plate-shaped optical unit 3c. Note that the light beam Lwd from the fourth light source assembly 4d is reflected by the mirror 14 and is incident on the third plate-shaped optical unit 3c.

Figure 11B:
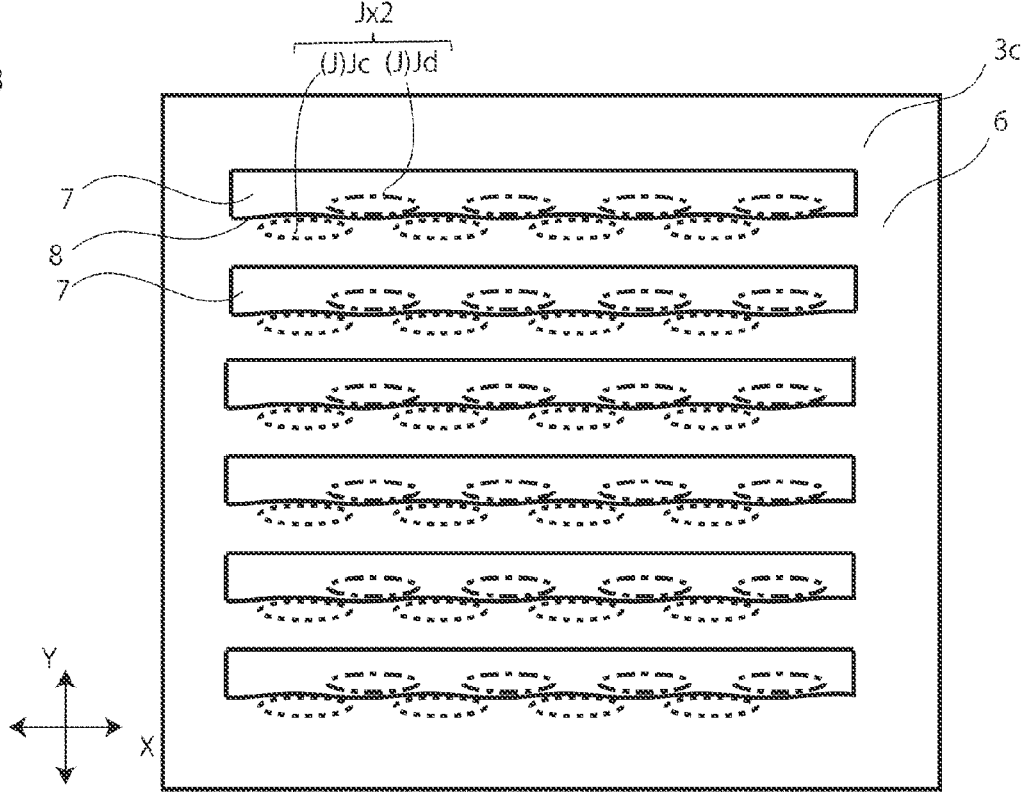
FIG. 11B is a view illustrating an example of a light intensity distribution of a light source light beam incident on a third plate-shaped optical unit arranged in the light source optical unit and an example of a formation pattern of a transmission surface and a reflection surface, in an example of a configuration of the illumination device according to the second embodiment.

In the second light source optical unit 2b, the transmission surface 6 and the reflection surface 7 of the third plate-shaped optical unit 3c are formed as illustrated in FIG. 11B. The boundary 8 between the transmission surface 6 and the reflection surface 7 of the third plate-shaped optical unit 3c is defined as described in the first embodiment.

The transmission surface 6 and the reflection surface 7 are formed on the first plate-shaped optical unit 3a.

The boundary 8 between the transmission surface 6 and the reflection surface 7 in the first plate-shaped optical unit 3a is formed at a position where incident light intensities of light beams individually from the plurality of light source optical units 2 have substantially equal values. The incident light intensity of the light beam from each of the light source optical units 2 can be specified on the basis of an incident light intensity distribution of a light beam from each of the light source optical units 2.

An incident light intensity distribution of a light beam from the first light source optical unit 2a is a combination of an incident light intensity distribution of the light source light beam of the first light source assembly 4a and an incident light intensity distribution of the light source light beam of the second light source assembly 4b. The incident light intensity distribution of the light source light beam of the first light source assembly 4a and the incident light intensity distribution of the light source light beam of the second light source assembly 4b are determined to have a distribution state in which a combination (a combined light intensity distribution Jx1) of the first light intensity distribution Ja and the second light intensity distribution Jb diagonally adjacent to each other is arranged in the vertical direction and the horizontal direction.

An incident light intensity distribution of a light beam from the second light source optical unit 2b is a combination of an incident light intensity distribution of a light source light beam of the third light source assembly 4c and an incident light intensity distribution of a light source light beam of the fourth light source assembly 4d. The incident light intensity distribution of the light source light beam of the third light source assembly 4c and the incident light intensity distribution of the light source light beam of the fourth light source assembly 4d are determined to have a distribution state in which a combination (a combined light intensity distribution Jx2) of the third light intensity distribution Jc and a fourth light intensity distribution Jd diagonally adjacent to each other is arranged in the vertical direction and the horizontal direction. Note that the third light intensity distribution Jc and the fourth light intensity distribution Jd indicate light intensity distributions of a light source light beam of a single light source of the third light source assembly 4c and a light source light beam of a single light source of the fourth light source assembly 4d, respectively.

Figure 10B:
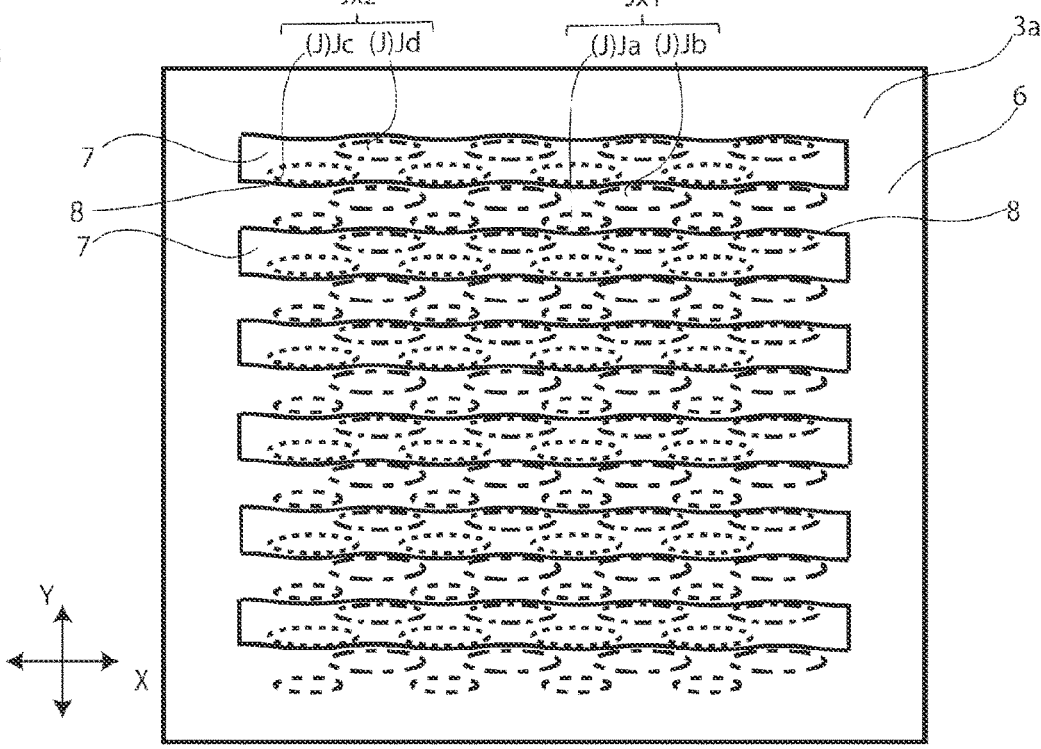
FIG. 10B is a view illustrating an example of a light intensity distribution of a light source light beam incident on a first plate-shaped optical unit and an example of a formation pattern of a transmission surface and a reflection surface, in the example of the illumination device illustrated in FIG. 10A.

The incident light intensity distributions of light beams from the light source optical units 2a and 2b in the third plate-shaped optical unit 3c are determined to have a distribution state in which the combined light intensity distribution Jx1 and the combined light intensity distribution Jx2 are alternately arranged in the vertical direction, as illustrated in FIG. 10B.

As described above, the boundary 8 between the transmission surface 6 and the reflection surface 7 in the first plate-shaped optical unit 3a is defined at a position where incident light intensities of light beams from the individual light source optical units 2a and 2b have substantially equal values.

According to this illumination device, light beams derived from four types of single light sources can be emitted in a state where directions are aligned with each other.

3. Third Embodiment (Illumination Device 1b)

Figure 14A:
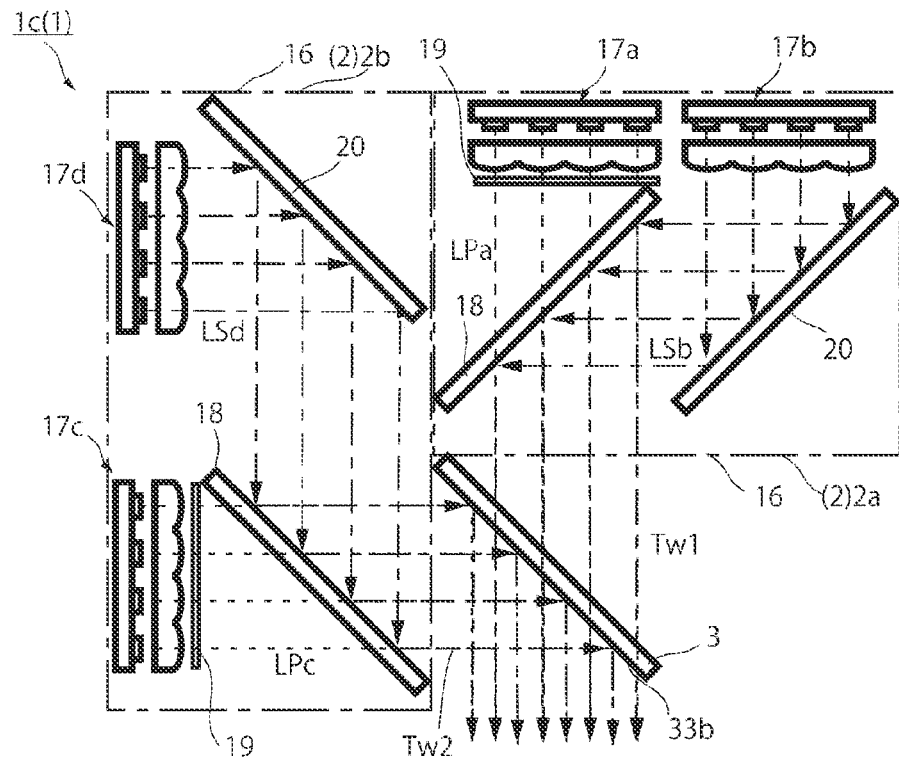
FIG. 14A is a view illustrating an example of a configuration of an illumination device according to a third embodiment.

FIG. 14A is a view illustrating an example of a configuration of an illumination device 1c (1) according to a third embodiment. The illumination device 1c includes a plurality of light source optical units 2 and a plate-shaped optical unit 3. Similarly to the first embodiment, the individual light source optical units 2 emit light derived individually from a plurality of single light sources in a state where directions are aligned with each other. In the example of the illumination device 1b of FIG. 14A, a first light source optical unit 2a and a second light source optical unit 2b are provided as the light source optical units. In the illumination device 1b, it is sufficient that a polarization optical system is provided in at least one of the light source optical units 2, but here, a case where the polarization optical systems are provided in both the light source optical units 2a and 2b will be described as an example.

(Traveling Path of Light Source Light Beam)

In the illumination device 1c, light beams emitted individually from the plurality of light source optical units 2 are incident on the plate-shaped optical unit 3. The light beams are incident on the plate-shaped optical unit 3 from mutually different directions. A light beam from the first light source optical unit 2a is incident from a one surface side of the plate-shaped optical unit 3 and passes toward another surface side. A light source light beam from the second light source optical unit 2b is incident on the another surface side of the plate-shaped optical unit 3 and is reflected on the another surface side. The light source light beam having passed through a transmission surface of the plate-shaped optical unit 3 forms transmitted light, and the light source light beam reflected by the reflection surface of the plate-shaped optical unit forms reflected light. In the illumination device 1c, the transmitted light and the reflected light are emitted in a direction away from the plate-shaped optical unit 3 in a state where directions are aligned with each other.

(Light Source Optical Unit 2)

In the example of the illumination device 1b of FIG. 14A, the first light source optical unit 2a and the second light source optical unit 2b are a polarization optical system 16 including polarized light source assemblies (17a, 17b) and (17c, 17d) and a polarization dichroic mirror 18.

Specifically, the first light source optical unit 2a includes: a first polarized light source assembly 17a configured to emit S-polarized light; a second polarized light source assembly 17b configured to emit S-polarized light; a ½ wavelength plate 19 configured to convert the S-polarized light emitted from the first polarized light source assembly 17a into P-polarized light; and the polarization dichroic mirror 18 configured to allow the P-polarized light to pass through and configured to reflect the S-polarized light from the second polarized light source assembly.

The second light source optical unit 2b includes: a third polarized light source assembly 17c configured to emit S-polarized light; a fourth polarized light source assembly 17d configured to emit S-polarized light; a ½ wavelength plate 19 configured to convert the S-polarized light emitted from the third polarized light source assembly 17c into P-polarized light; and the polarization dichroic mirror 18 configured to allow the P-polarized light to pass through and configured to reflect the S-polarized light from the fourth polarized light source assembly.

In the first light source optical unit 2a, S-polarized light from the first polarized light source assembly 17a is converted into P-polarized light (a light beam LPa) by passing through the ½ wavelength plate 19. The P-polarized light is incident toward the polarization dichroic mirror 18 and is transmitted through the polarization dichroic mirror 18. The S-polarized light (a light beam LSb) from the second polarized light source assembly 17b is reflected by a mirror 20 and incident toward the polarization dichroic mirror 18. The S-polarized light is reflected by a surface of the polarization dichroic mirror 18, and has an optical axis being aligned with that of the P-polarized light. At this time, a multiplexed light beam Tw1 of the S-polarized light and the P-polarized light is formed. The multiplexed light beam Tw1 is incident on the plate-shaped optical unit 3.

In the second light source optical unit 2b, S-polarized light from the third polarized light source assembly 17c is converted into P-polarized light (a light beam LPc) by passing through the ½ wavelength plate 19. The P-polarized light is incident toward the polarization dichroic mirror 18 and passes through a surface of the polarization dichroic mirror 18. The S-polarized light (a light beam LSd) from the fourth polarized light source assembly 17d is reflected by the mirror 20 and incident toward the polarization dichroic mirror 18. The S-polarized light is reflected by a surface of the polarization dichroic mirror 18, and has an optical axis being matched with that of the P-polarized light. At this time, similarly to the first light source optical unit 2a, a multiplexed light beam Tw2 of the S-polarized light and the P-polarized light is formed. The multiplexed light beam Tw2 is incident on the plate-shaped optical unit 3.

(Polarization Dichroic Mirror 18)

Figure 15:
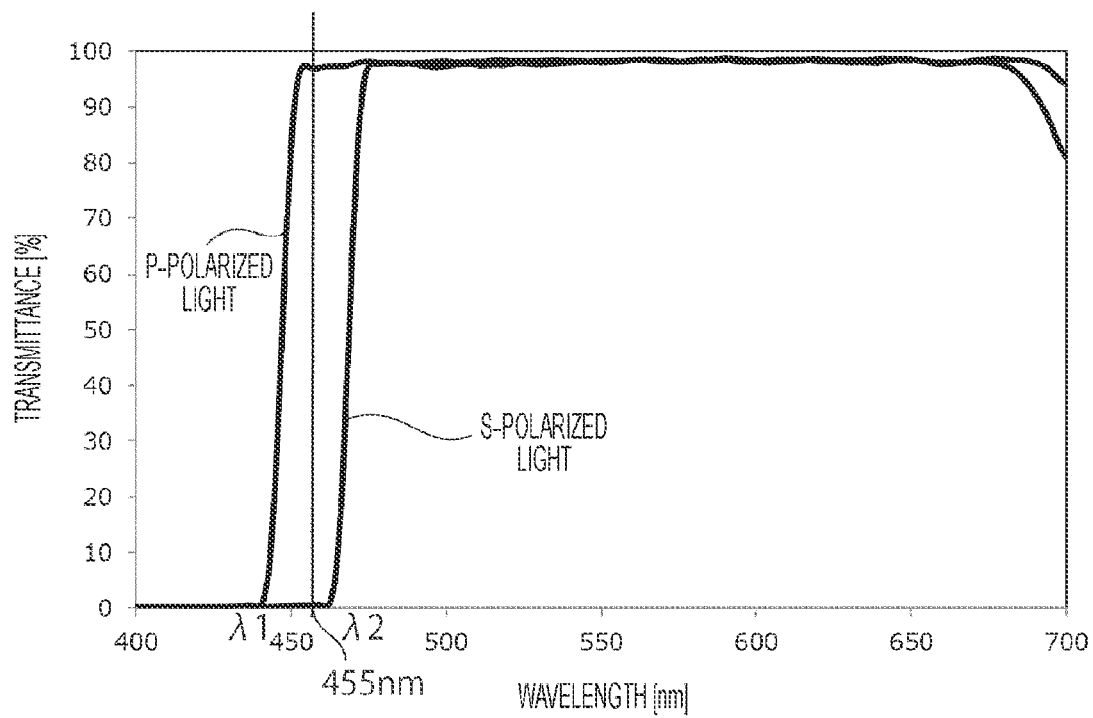
FIG. 15 is a graph illustrating filter characteristics of a polarization dichroic mirror.

For the polarization dichroic mirror 18 included in the first light source optical unit 2a and the second light source optical unit 2b, one is adopted having such filter characteristics that there is a difference in transmissivity and reflectivity between P-polarized light and S-polarized light, for light in a predetermined wavelength range. For example, as the polarization dichroic mirror 18, one having filter characteristics as illustrated in FIG. 15 can be adopted. An example of the polarization dichroic mirror having the filter characteristics illustrated in FIG. 15 has a property of transmitting P-polarized light and reflecting S-polarized light between wavelengths A1 and A2, particularly at approximately 455 nm. For example, by combining a filter having such characteristics as the polarization dichroic mirror 18 and one configured to emit S-polarized light having wavelengths A1 to A2 as a polarized light source assembly, the first light source optical unit and the second light source optical unit can be specifically implemented.

(Plate-Shaped Optical Unit 3)

The plate-shaped optical unit 3 of the illumination device according to the third embodiment has, similarly to the plate-shaped optical unit of the illumination device of the first embodiment, a configuration sectioned into a transmission surface 6 and a reflection surface 7 in accordance with an incident light intensity distribution of a light beam from the light source optical unit. The transmission surface 6 and the reflection surface 7 are formed on a surface 33b on an emission surface side of transmitted light and reflected light derived from light source light beams, among surfaces of the plate-shaped optical unit 3.

An incident light intensity distribution of the multiplexed light beam Tw1 from the first light source optical unit 2a is a combination of an incident light intensity distribution of the P-polarized light from the first polarized light source assembly 17a and an incident light intensity distribution of the S-polarized light from the second polarized light source assembly 17b. The incident light intensity distribution of the light source light beam of the first polarized light source assembly 17a and the incident light intensity distribution of the light source light beam of the second polarized light source assembly 17b are determined to have a distribution state in which combinations of overlapping light intensity distribution Jpa and light intensity distribution Jsb (an overlapping light intensity distribution Jy1) are arranged in a lattice shape. The light intensity distribution Jpa and the light intensity distribution Jsb indicate light intensity distributions of a light source light beam of a single light source of the first polarized light source assembly 17a and a light source light beam of a single light source of the second polarized light source assembly 17b, respectively.

An incident light intensity distribution of the multiplexed light beam Tw2 from the second light source optical unit 2b is a combination of an incident light intensity distribution of the P-polarized light from the third polarized light source assembly 17c and an incident light intensity distribution of the S-polarized light from the fourth polarized light source assembly 17d. The incident light intensity distribution of the light source light beam of the third polarized light source assembly 17c and the incident light intensity distribution of the light source light beam of the fourth polarized light source assembly 17d are determined to have a distribution state in which combinations of overlapping light intensity distribution Jpc and light intensity distribution Jsd (an overlapping light intensity distribution Jy2) are arranged in a lattice shape. The light intensity distribution Jpc and the light intensity distribution Jsd indicate light intensity distributions of a light source light beam of a single light source of the third polarized light source assembly 17c and a light source light beam of a single light source of the fourth polarized light source assembly 17d, respectively.

Figure 14B:
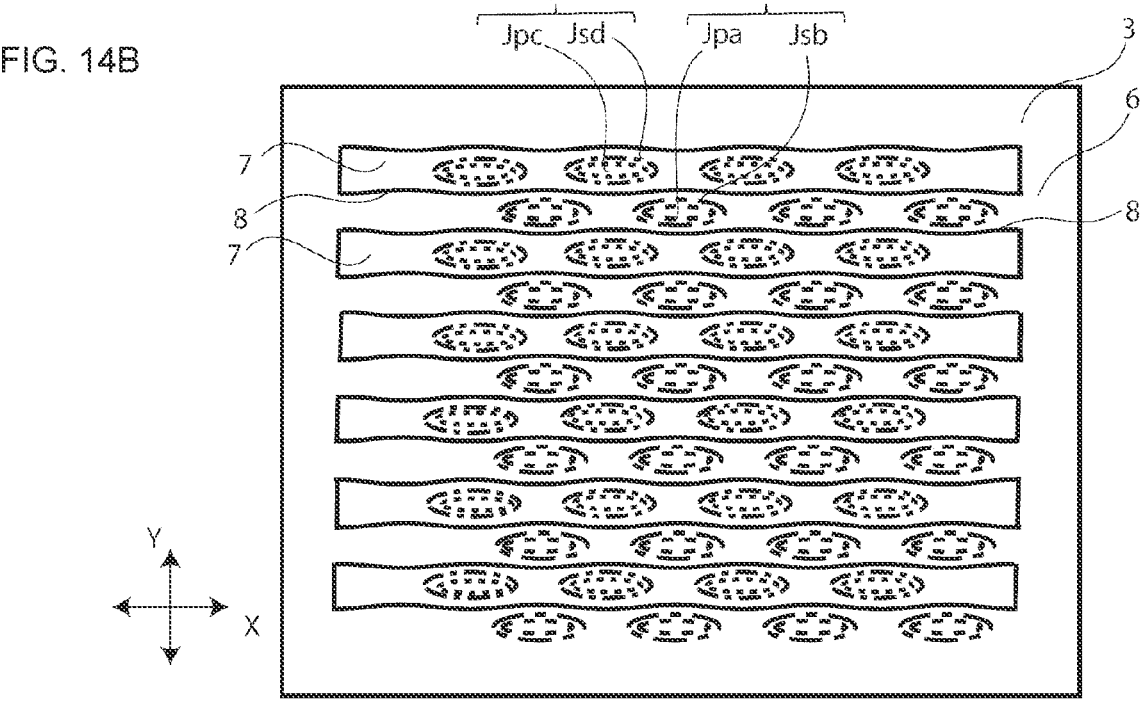
FIG. 14B is a view illustrating an example of a light intensity distribution of a light source light beam incident on a plate-shaped optical unit and an example of a formation pattern of a transmission surface and a reflection surface, in the example of the illumination device illustrated in FIG. 14A.

As illustrated in FIG. 14B, the incident light intensity distributions of light beams from the light source optical units 2a and 2b in the plate-shaped optical unit 3 are determined to have a distribution state in which the overlapping light intensity distribution Jy1 and an overlapping light intensity distribution Jy2 are alternately arranged in an oblique direction.

(Boundary 8 Between Transmission Surface 6 and Reflection Surface 7)

A boundary between the transmission surface and the reflection surface in the first plate-shaped optical unit is defined at a position where incident light intensities of the multiplexed light beams Tw1 and Tw2 to be light beams from the individual light source optical units have substantially equal values to each other.

As described in the first embodiment, the position where the incident light intensities have substantially equal values indicates a position where Formulas 1A to 3A are satisfied in a case where a condition A is satisfied, and Formulas 3A to 6A are satisfied in a case where a condition B is satisfied. Furthermore, similarly to the first embodiment, it is preferable that the position where the incident light intensities have substantially equal values is a position where Formulas 1B to 3B are satisfied in a case where the condition A is satisfied and Formulas 4B to 6B are satisfied in a case where the condition B is satisfied.

In the plate-shaped optical unit 3, the transmission surface 6 and the reflection surface 7 are formed as illustrated in FIG. 14B on the basis of the criteria described above.

According to the illumination device of the third embodiment, it is possible to obtain one capable of further reducing a size of an emitted luminous flux while increasing a ratio of an amount of light used as emitted light to an amount of light incident on the first plate-shaped optical unit from the polarized light source assembly.

Next, an example of a display device according to the present disclosure will be described.

[4. Display Device]

Figure 16:
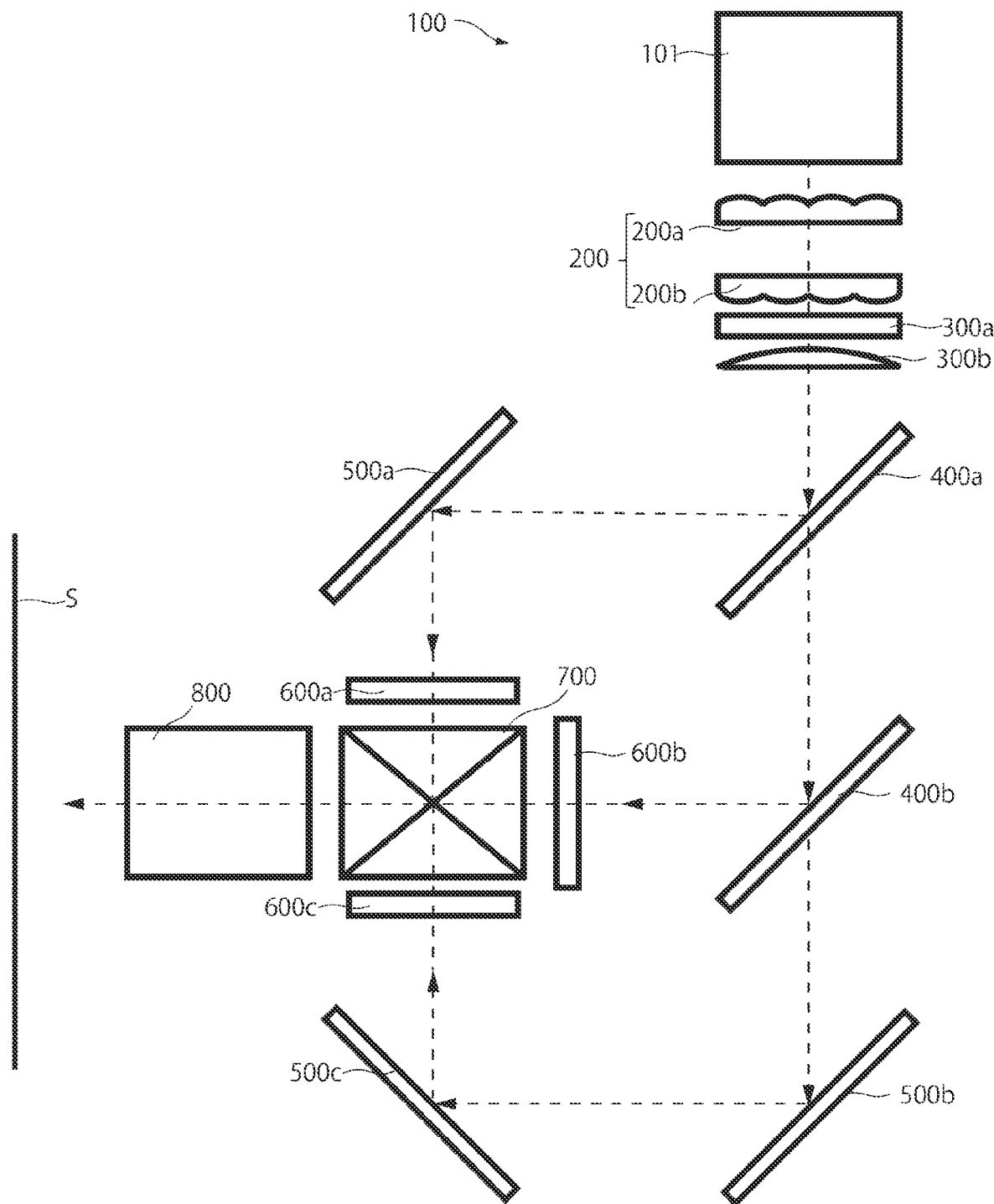
FIG. 16 is a view illustrating an example of a configuration of a display device including an illumination device according to the present disclosure in a light source unit.

In FIG. 16, a display device 100 shows a configuration example of a projector that projects an image on a display surface such as a screen S. The display device 100 illustrated in FIG. 16 is a configuration example of a projector using 3LCD.

Light emitted from a light source unit 101 passes through an integrator lens 200 including a first lens array 200a and a second lens array 200b, then passes through a polarization conversion element 300a and a condenser lens 300b, and is separated for each wavelength range. The integrator lens 200 suppresses variations in brightness of a central portion and brightness of an end portion of the display image.

The light having passed through the condenser lens 300b is incident on a first reflection dichroic mirror 400a. Light in a red wavelength range is selectively reflected, and light in other wavelength ranges is allowed to pass. As a result, light in the red wavelength range is reflected by the first reflection dichroic mirror 400a and travels toward a reflection mirror 500a side. The light in the red wavelength range is further reflected by the reflection mirror 500a and is incident on a red liquid crystal panel 600a.

The light in other wavelength ranges having passed through the first reflection dichroic mirror 400a is incident on a second reflection dichroic mirror 400b. The second reflection dichroic mirror 400b selectively reflects light in a green wavelength range and allows light in a blue wavelength range, which is to be light in other wavelength ranges, to pass through. The light in the green wavelength range reflected by the second reflection dichroic mirror 400b is incident on a green liquid crystal panel 600b. Furthermore, the light in the blue wavelength range having passed through the second reflection dichroic mirror 400b is reflected by reflection mirrors 500b and 500c, and then incident on a blue liquid crystal panel 600c.

The liquid crystal panels 600a, 600b, and 600c for the respective colors modulate light that is individually incident in accordance with an input image signal, and generate signal light of an image corresponding to RGB. For the liquid crystal panels 600a, 600b, and 600c, for example, a transmissive liquid crystal element using a high-temperature polysilicon TFT may be used. The signal light modulated by each of the liquid crystal panels 600a, 600b, and 600c is incident on a dichroic prism 700 and synthesized. The dichroic prism 700 is formed in a rectangular parallelepiped obtained by combining four triangular prisms so as to reflect red signal light and blue signal light and to transmit green signal light. The signal light of each color synthesized by the dichroic prism 700 is incident on a projection lens 800 and projected as an image on a display surface such as the screen S.

In the display device 100, the liquid crystal panels 600a, 600b, and 600c and the dichroic prism 700 function as a light modulation-synthesis system. The light modulation-synthesis system is an optical system that modulates and synthesizes incident light. The integrator lens 200, the polarization conversion element 300a, the condenser lens 300b, the reflection dichroic mirrors 400a and 400b, and the reflection mirrors 500a, 500b, and 500c function as an illumination optical system. The illumination optical system is an optical system that guides light from the light source unit 101 to the liquid crystal panels 600a, 600b, and 600c. Then, the projection lens 800 functions as a projection optical system. The projection optical system is an optical system that projects an image emitted from the dichroic prism 700.

In the display device 100, any of the illumination devices of the first to third embodiments may be provided as the light source unit 101.

According to the illumination devices of the first to third embodiments, it is possible to further reduce a size of an emitted luminous flux. Therefore, the display device according to the present disclosure can reduce a size of the device by including the illumination device according to the present disclosure.

The projector using the 3LCD has been described as an example of the display device including the illumination device according to the present disclosure, but the display device is not limited to this. For example, the display device may be a DLP (trademark) projector or the like.

EXAMPLES

Example 1

An illumination device having a configuration as illustrated in FIG. 5 was produced. As illustrated in FIGS. 1 and 2A, a plate-shaped optical unit in which a boundary between a transmission surface and a reflection surface is formed into a corrugated shape was prepared. As a single light source constituting a first light source assembly and a second light source assembly, one including a semiconductor laser and a lens that suppresses diffusion of laser light was used. The first light source assembly and the second light source assembly were positioned such that a profile of an incident light intensity distribution along a straight line M in the plate-shaped optical unit was a profile as illustrated in FIG. 2B.

In this device, an optical path length L1a between the first light source assembly and the plate-shaped optical unit was 25.8 mm, and an optical path length L1b between the second light source assembly and the plate-shaped optical unit was 87.5 mm.

Furthermore, in the illumination device, in a case where the power Pa derived from a single light source constituting the first light source assembly was 1.0, the power Pa derived from a single light source constituting the second light source assembly was 0.989. An intensity (a maximum intensity) Ia_max at a first intensity center was 0.589 (W/mm$^2$), and an intensity (a maximum intensity) Ib_max at a second intensity center was 0.308 (W/mm$^2$). On the basis of the profile illustrated in FIG. 2B, a position where the profile derived from the single light source constituting the first light source assembly and the profile derived from the single light source constituting the second light source assembly intersect was defined as a boundary between transmitted light and reflected light. At this time, both an intensity Ia_f of a first light source light beam and an intensity Ib_f of a second light source light beam at the boundary position were 0.036 (W/mm$^2$).

Comparative Example 1

As illustrated in FIG. 17, a plate-shaped optical unit in which a boundary between a transmission surface and a reflection surface is formed in a linear shape (a reflection surface is formed in a strip shape) was prepared. A boundary position between the transmission surface and the reflection surface was a position along a straight line M and a position closer to a second intensity center side than in Example 1, and the boundary position was a distance Q illustrated in FIG. 2B.

(Comparison Evaluation)

An amount of light emitted from the illumination devices obtained in Example 1 and Comparative Example 1 was measured. It was confirmed that an amount of light emitted from the illumination device of Example 1 was 3.2% higher than an amount of light emitted from the illumination device of Comparative Example 1.

Note that the contents of the present disclosure are not to be construed as being limited by the effects exemplified in the present disclosure.

The present disclosure may have the following configurations.

(1) An illumination device including:
   a plurality of light source assemblies; and
   a plate-shaped optical unit on which light source light beams from the plurality of light source assemblies are incident from mutually different directions, the plate-shaped optical unit being sectioned into a reflection surface and a transmission surface in accordance with an incident light intensity distribution of each of the light source light beams, in which
   transmitted light having passed through the plate-shaped optical unit among the light source light beams and reflected light having been reflected by the plate-shaped optical unit among the light source light beams are emitted with directions aligned, and
   a boundary between the transmission surface and the reflection surface in the plate-shaped optical unit is formed at a position where incident light intensities of the light source light beams individually from the plurality of light source assemblies have substantially equal values to each other, (2) The illumination device according to (1) described above, in which
   the plurality of light source assemblies includes a first light source assembly serving as a light source of the transmitted light and a second light source assembly serving as a light source of the reflected light, and
   a first incident light intensity distribution formed in the plate-shaped optical unit by a light source light beam from the first light source assembly is different from a second incident light intensity distribution formed in the plate-shaped optical unit by a light source light beam from the second light source assembly, (3) The illumination device according to (1) or (2) described above, in which
   the plurality of light source assemblies includes a first light source assembly serving as a light source of the transmitted light and a second light source assembly serving as a light source of the reflected light, and
   an optical path length between the first light source assembly and the plate-shaped optical unit is different from an optical path length between the second light source assembly and the plate-shaped optical unit, (4) The illumination device according to any one of (1) to (3) described above, in which
the plurality of light source assemblies includes a first light source assembly serving as a light source of the transmitted light and a second light source assembly serving as a light source of the reflected light,
an optical path length between the second light source assembly and the plate-shaped optical unit is larger than an optical path length between the first light source assembly and the plate-shaped optical unit, and
in a case of assuming a straight line connecting a first intensity center and a second intensity center, while a maximum intensity position is defined as the first intensity center, the maximum intensity position being of incident light derived from a first single light source selected from the first light source assembly in a first incident light intensity distribution formed by a light source light beam from the first light source assembly, and a center position is defined as the second intensity center, the center position being of an incident light intensity derived from a second single light source that forms the second light source assembly and is closest to the first intensity center, and
a distance on the straight line from the second intensity center to the boundary is larger than a distance on the straight line from the first intensity center to the boundary, (5) The illumination device according to any one of (1) to (4) described above, in which
the plurality of light source assemblies includes a first light source assembly serving as a light source of the transmitted light and a second light source assembly serving as a light source of the reflected light, and
a first light intensity distribution of a light source light beam derived from a single light source forming the first light source assembly and a second light intensity distribution of a light source light beam derived from a single light source forming the second light source assembly are distributions exhibiting anisotropic contours having different orientations from each other, (6) The illumination device according to any one of (1) to (5) described above, in which
the plurality of light source assemblies includes a first light source assembly serving as a light source of the transmitted light and a second light source assembly serving as a light source of the reflected light, and
an interval between adjacent single light sources forming the first light source assembly is different from an interval between adjacent single light sources forming the second light source assembly, (7) The illumination device according to any one of (1) to (6) described above, in which
the plurality of light source assemblies includes a first light source assembly serving as a light source of the transmitted light and a second light source assembly serving as
a light source of the reflected light, and a number of single light sources forming the first light source assembly is different from a number of single light sources forming the second light source assembly, (8) The illumination device according to any one of (1) to (7) described above, in which
the plurality of light source assemblies includes a first light source assembly serving as a light source of the transmitted light and a second light source assembly serving as a light source of the reflected light, and
in a case of assuming a straight line connecting a first intensity center and a second intensity center, while a center position of incident light intensity derived from a first single light source selected from the first light source assembly is defined as the first intensity center in a first incident light intensity distribution formed by a light source light beam from the first light source assembly, and a center position of an incident light intensity derived from a second single light source that forms the second light source assembly and is closest to the first intensity center is defined as the second intensity center,
a value $Ia\_max/Ra$ obtained by dividing an intensity $Ia\_max$ at the first intensity center by power $Pa$ derived from the first single light source is larger than a value $Ib\_max/Pb$ obtained by dividing an intensity $Ib\_max$ at the second intensity center by power $Pb$ derived from the second single light source, and
a distance on the straight line from the second intensity center to the boundary is larger than a distance on the straight line from the first intensity center to the boundary.

(9) The illumination device according to any one of (1) to (8) described above, in which
the plurality of light source assemblies includes a first light source assembly serving as a light source of the transmitted light and a second light source assembly serving as a light source of the reflected light, and
a main wavelength of a light source light beam from the first light source assembly and a main wavelength of a light source light beam from the second light source assembly are different from each other.

(10) The illumination device according to any one of (1) to (9) described above, in which a single light source forming at least one of the plurality of light source assemblies is a collimated light source including a light emitting diode and a condenser lens that is arranged on a light emission surface side of the light emitting diode.

(11) An illumination device including:
a plurality of light source optical units configured to emit light beams derived from a plurality of single light sources in a state where directions are aligned with each other; and
a first plate-shaped optical unit on which the light beams from the plurality of light source optical units are incident from mutually different directions, the first plate-shaped optical unit being sectioned into a reflection surface and a transmission surface in accordance with an incident light intensity distribution of each of the light beams, in which
transmitted light having passed through the first plate-shaped optical unit among the light beams and reflected light having been reflected by the first plate-shaped optical unit among the light beams are emitted with directions aligned,
a boundary between the transmission surface and the reflection surface in the first plate-shaped optical unit is formed at a position where incident light intensities of light beams individually from the plurality of light source optical units have substantially equal values to each other,
at least one of the light source optical units includes:
a plurality of light source assemblies; and
a second plate-shaped optical unit on which light source light beams from the plurality of light source assemblies are incident from mutually different directions, the second plate-shaped optical unit being sectioned into a reflection surface and a transmission surface in accordance with an incident light intensity distribution of each of the light source light beams, a boundary between the transmission surface and the reflection surface in the second plate-shaped optical unit is formed at a position where incident light intensities of the light source light beams individually from the plurality of light source assemblies have substantially equal values to each other, and transmitted light having passed through the second plate-shaped optical unit among the light source light beams and reflected light having been reflected by the second plate-shaped optical unit among the light source light beams are emitted with directions aligned,

(12) An illumination device including:

a plurality of light source optical units configured to emit light beams derived from a plurality of single light sources in a state where directions are aligned with each other; and a plate-shaped optical unit on which the light beams from the plurality of light source optical units are incident from mutually different directions, the plate-shaped optical unit being sectioned into a reflection surface and a transmission surface in accordance with an incident light intensity distribution of each of the light beams, in which transmitted light having passed through the plate-shaped optical unit among the light beams and reflected light having been reflected by the plate-shaped optical unit among the light beams are emitted with directions aligned, a boundary between the transmission surface and the reflection surface in the plate-shaped optical unit is formed at a position where incident light intensities of light beams individually from the plurality of light source optical units have substantially equal values to each other, at least one of the light source optical units includes:

a first polarized light source assembly and a second polarized light source assembly that are configured to mutually emit S-polarized light, and a ½ wavelength plate configured to convert the S-polarized light emitted from the first polarized light source assembly into P-polarized light; and a polarization dichroic mirror configured to allow the P-polarized light to pass through and configured to reflect the S-polarized light from the second polarized light source assembly, and a multiplexed light beam of the P-polarized light having passed through the polarization dichroic mirror and the S-polarized light reflected by the polarization dichroic mirror is emitted,

(13) A display device including:

a light source unit;

a light modulation-synthesis system configured to modulate and synthesize incident light;

an illumination optical system configured to guide light emitted from the light source unit to the light modulation-synthesis system; and a projection optical system configured to project an image emitted from the light modulation-synthesis system, in which the light source unit is the illumination device according to any one of (1) to (12) described above.

REFERENCE SIGNS LIST 1, 1a, 1b, 1c Illumination device
2 Light source optical unit
2a First light source optical unit
2b Second light source optical unit
3 Plate-shaped optical unit
3a First plate-shaped optical unit
3b Second plate-shaped optical unit
3c Third plate-shaped optical unit
33a One surface of plate-shaped optical unit
33b Another surface of plate-shaped optical unit
4 Light source assembly
4a First light source assembly
4b Second light source assembly
4c Third light source assembly
4d Fourth light source assembly
5 Single light source
6 Transmission surface
7 Reflection surface
8 Boundary
9 Light emitting element
10 Lens
11 Light emitting diode
12 Condenser lens
14 Mirror
16 Polarization optical system
17, 17a, 17b, 17c, 17d Polarized light source assembly
18 Polarization dichroic mirror
19 ½ wavelength plate
20 Mirror
21 Collimated light source

What is claimed is:

1. An illumination device, comprising:
a plurality of light source assemblies; and
a plate-shaped optical unit, including:
  a plurality of transmission surface areas, wherein each of the transmission surface areas has a length that extends parallel to a first direction along the plate-shaped optical unit and a width that extends parallel to a second direction along the plate-shaped optical unit that is orthogonal to the first direction; and
  a plurality of reflection surface areas, wherein each of the reflection surface areas has a length that extends parallel to the first direction and a width that extends parallel to the second direction that is orthogonal to the first direction,
  wherein the transmission surfaces are interleaved with the reflection surface areas along the second direction,
  wherein a width of each transmission surface area in the plurality of transmission surface areas periodically varies with distance along the length of the transmission surface area,
  wherein a width of each reflection surface area in the plurality of reflection surface areas periodically varies with distance along the length of the reflection surface area, and
  wherein the widths of the transmission surface areas and the reflection surface areas are complementary to one another such that, at a location along the length of the transmission surface area where the width of the transmission surface is equal to a maximum width of the transmission surface area, a width of the reflection surface area at a corresponding location along the length of the reflection surface area is equal to a minimum width of the reflection surface area, and such that, at a location along the length of the transmission surface area where the width of the transmission surface area is equal to a minimum width of the transmission surface area, a width of the reflection surface area at a corresponding location along the length of the reflection surface area is equal to a maximum width of the reflection surface area.

2. The illumination device according to claim 1, wherein each transmission surface area has a maximum width at equal intervals along the length of the transmission surface area, and wherein each reflection surface area has a maximum width at equal intervals along the length of the reflection surface area.

3. The illumination device according to claim 1, wherein
the plurality of light source assemblies includes a first light source assembly serving as a light source of a first light beam that is transmitted by one or more of the transmission surface areas and a second light source assembly serving as a light source of a second light beam that is reflected by one or more of the reflection surface areas, and
an optical path length between the first light source assembly and the plate-shaped optical unit is different from an optical path length between the second light source assembly and the plate-shaped optical unit.

4. The illumination device according to claim 1, wherein a boundary between each transmission surface area and an adjacent reflection surface area is undulating.

5. The illumination device according to claim 1, wherein the plurality of light source assemblies includes a first light source assembly serving as a light source of a transmitted light beam and a second light source assembly serving as a light source of a reflected light beam.

6. The illumination device according to claim 1, wherein
the plurality of light source assemblies includes a first light source assembly serving as a light source of a transmitted light beam and a second light source assembly serving as a light source of a reflected light beam, and
an interval between adjacent single light sources forming the first light source assembly is different from an interval between adjacent single light sources forming the second light source assembly.

7. The illumination device according to claim 1, wherein
the plurality of light source assemblies includes a first light source assembly serving as a light source of a transmitted light beam and a second light source assembly serving as a light source of a reflected light beam, and
a number of single light sources forming the first light source assembly is different from a number of single light sources forming the second light source assembly.

8. The illumination device according to claim 1, wherein
the plurality of light source assemblies includes a first light source assembly serving as a light source of a transmitted light beam and a second light source assembly serving as a light source of a reflected light beam, and
a main wavelength of a light source light beam from the first light source assembly and a main wavelength of a light source light beam from the second light source assembly are different from each other.

9. The illumination device according to claim 1, wherein a single light source forming at least one of the plurality of light source assemblies is a collimated light source including a light emitting diode and a condenser lens that is arranged on a light emission surface side of the light emitting diode.

10. A display device, comprising:
a light source unit;
a light modulation-synthesis system configured to modulate and synthesize incident light;
an illumination optical system configured to guide light emitted from the light source unit to the light modulation-synthesis system; and
a projection optical system configured to project an image emitted from the light modulation-synthesis system, wherein
the light source unit is an illumination device, the illumination device comprising:
a plurality of light source assemblies; and
a plate-shaped optical unit, including:
a plurality of transmission surface areas, wherein each of the transmission surface areas has a length that extends parallel to a first direction along the plate-shaped optical unit and a width that extends parallel to a second direction along the plate-shaped optical unit that is orthogonal to the first direction; and
a plurality of reflection surface areas, wherein each of the reflection surface areas has a length that extends parallel to the first direction and a width that extends parallel to the second direction that is orthogonal to the first direction,
wherein the transmission surfaces are interleaved with the reflection surface areas along the second direction,
wherein a width of each transmission surface area in the plurality of transmission surface areas periodically varies with distance along the length of the transmission surface area,
wherein a width of each reflection surface area in the plurality of reflection surface areas periodically varies with distance along the length of the reflection surface area, and
wherein the widths of the transmission surface areas and the reflection surface areas are complementary to one another such that, at a location along the length of the transmission surface area where the width of the transmission surface is equal to a maximum width of the transmission surface area, a width of the reflection surface area at a corresponding location along the length of the reflection surface area is equal to a minimum width of the reflection surface area, and such that, at a location along the length of the transmission surface area where the width of the transmission surface area is equal to a minimum width of the transmission surface area, a width of the reflection surface area at a corresponding location along the length of the reflection surface area is equal to a maximum width of the reflection surface area.

11. The display device according to claim 10, wherein each transmission surface area has a maximum width at equal intervals along the length of the transmission surface area, and wherein each reflection surface area has a maximum width at equal intervals along the length of the reflection surface area.

12. The display device according to claim 10, wherein a boundary between each transmission surface area and an adjacent reflection surface area is undulating.

13. The display device according to claim 10, wherein
the plurality of light source assemblies includes a first light source assembly serving as a light source of a transmitted light beam and a second light source assembly serving as a light source of a reflected light beam, and
a first light intensity distribution of a light beam derived from a single light source forming the first light source assembly and a second light intensity distribution of a light beam derived from a single light source forming the second light source assembly exhibit anisotropic contours having different orientations from each other.

14. The display device according to claim 10, wherein
the plurality of light source assemblies includes a first light source assembly serving as a light source of a transmitted light beam and a second light source assembly serving as a light source of a reflected light beam, and
an optical path length between the first light source assembly and the plate-shaped optical unit is different from an optical path length between the second light source assembly and the plate-shaped optical unit.

15. The display device according to claim 10, wherein
the plurality of light source assemblies includes a first light source assembly serving as a light source of a transmitted light beam and a second light source assembly serving as a light source of a reflected light beam, and
a number of single light sources forming the first light source assembly is different from a number of single light sources forming the second light source assembly.

16. The display device according to claim 10, wherein
the plurality of light source assemblies includes a first light source assembly serving as a light source of a transmitted light beam and a second light source assembly serving as a light source of a reflected light beam, and
a main wavelength of a light source light beam from the first light source assembly and a main wavelength of a light source light beam from the second light source assembly are different from each other.

17. The display device according to claim 10, wherein
the plurality of light source assemblies includes a first light source assembly serving as a light source of a transmitted light beam and a second light source assembly serving as a light source of a reflected light beam, and
an interval between adjacent single light sources forming the first light source assembly is different from an interval between adjacent single light sources forming the second light source assembly.

18. The display device according to claim 10, wherein a single light source forming at least one of the plurality of light source assemblies is a collimated light source including a light emitting diode and a condenser lens that is arranged on a light emission surface side of the light emitting diode.

19. A display device, comprising:
a light source unit;
a light modulation-synthesis system configured to modulate and synthesize incident light;
an illumination optical system configured to guide light emitted from the light source unit to the light modulation-synthesis system; and
a projection optical system configured to project an image emitted from the light modulation-synthesis system, wherein
the light source unit is an illumination device, the illumination device comprising:
a plurality of light source assemblies; and
a plate-shaped optical unit having a transmission surface and a reflection surface, the transmission surface being configured to transmit a light beam received from at least one of the plurality of light source assemblies and the reflection surface being configured to reflect another light beam received from another at least one of the plurality of light source assemblies, wherein
the plate-shaped optical unit comprises a boundary between the reflection surface and the transmission surface such that incident light intensities of the light beams received from each of the plurality of light source assemblies have substantially equal values to each other.

* * * * *